United States Patent
Park et al.

(10) Patent No.: US 9,936,096 B2
(45) Date of Patent: Apr. 3, 2018

(54) IMAGE FORMING APPARATUS HAVING A DOCKING UNIT TO MOUNT A PLURALITY OF PORTABLE DISPLAY APPARATUSES, A PORTABLE DISPLAY APPARATUS MOUNTABLE TO THE DOCKING UNIT, A PRINTING CONTROL METHOD USING THE DOCKING UNIT, AND A DISPLAY METHOD USING THE DOCKING UNIT

(71) Applicant: S-PRINTING SOLUTION CO., LTD., Suwon-si, Gyeonggi-do (KR)

(72) Inventors: Sung-jin Park, Suwon-si (KR); Min-keun Song, Seoul (KR); Sun-hee Lee, Suwon-si (KR); Jong-in Lee, Suwon-si (KR); Jun-young Lee, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/244,646

(22) Filed: Aug. 23, 2016

(65) Prior Publication Data

US 2017/0171425 A1    Jun. 15, 2017

(30) Foreign Application Priority Data

Dec. 11, 2015    (KR) .................. 10-2015-0177002

(51) Int. Cl.
*H04N 1/32*    (2006.01)
*H04N 1/00*    (2006.01)

(52) U.S. Cl.
CPC ..... *H04N 1/32577* (2013.01); *H04N 1/00381* (2013.01); *H04N 1/00493* (2013.01);
(Continued)

(58) Field of Classification Search
CPC ........... H04N 1/32577; H04N 1/00538; H04N 1/32272; H04N 1/00493; H04N 1/00381; H04N 2201/0058; H04N 2201/0094
See application file for complete search history.

(56) References Cited

U.S. PATENT DOCUMENTS 6,888,643 B1    5/2005    Grimes
7,573,593 B2 *  8/2009    Hart .................. H04N 1/00127
                                                348/14.03
(Continued)

FOREIGN PATENT DOCUMENTS

JP        2011-180631       9/2011
KR     10-2012-0107249      10/2012
(Continued)

OTHER PUBLICATIONS

International Search Report dated Sep. 12, 2016 from International Patent Application No. PCT/KR2016/003928, 3 pages.
(Continued)

*Primary Examiner* — Ming Hon
(74) *Attorney, Agent, or Firm* — Staas & Halsey LLP

(57) ABSTRACT

An image forming apparatus includes a docking unit configured to mount a plurality of portable display apparatuses therein, a communication interface configured to receive data, and a processor configured to control to store the received data in at least one of the plurality of portable display apparatuses.

18 Claims, 51 Drawing Sheets

(52) U.S. Cl.
CPC ..... *H04N 1/00538* (2013.01); *H04N 1/32272* (2013.01); *H04N 2201/0058* (2013.01); *H04N 2201/0094* (2013.01)

(56) References Cited

U.S. PATENT DOCUMENTS

| | | | | |
|---|---|---|---|---|
| 8,699,061 | B2* | 4/2014 | Rothery | G06F 1/1626 345/156 |
| 2002/0015168 | A1* | 2/2002 | Schindler | G03B 27/521 358/1.12 |
| 2004/0070681 | A1* | 4/2004 | Battles | H04N 1/00204 348/333.01 |
| 2005/0086328 | A1* | 4/2005 | Landram | H04L 67/34 709/220 |
| 2006/0061804 | A1 | 3/2006 | Manico et al. | |
| 2007/0002351 | A1 | 1/2007 | Yoshimura et al. | |
| 2011/0261509 | A1* | 10/2011 | Xu | G06F 1/1632 361/679.01 |
| 2012/0236358 | A1* | 9/2012 | Huang | G06F 3/121 358/1.15 |
| 2013/0298069 | A1* | 11/2013 | Petschnigg | G06F 3/0483 715/776 |
| 2014/0118769 | A1* | 5/2014 | Adachi | G06F 3/1211 358/1.13 |
| 2014/0233053 | A1 | 8/2014 | Kakutani | |
| 2014/0300915 | A1* | 10/2014 | Ishikura | G03G 15/5066 358/1.13 |
| 2015/0062611 | A1* | 3/2015 | Yamakawa | H04N 1/00896 358/1.13 |
| 2015/0092005 | A1* | 4/2015 | Kato | H04N 1/00299 348/14.04 |
| 2015/0199157 | A1* | 7/2015 | Xiao | G06F 3/1236 358/1.15 |
| 2016/0044185 | A1* | 2/2016 | Takahashi | H04N 1/00212 358/1.14 |

FOREIGN PATENT DOCUMENTS

| | | |
|---|---|---|
| KR | 10-2013-0111298 | 10/2013 |
| KR | 10-2014-0044690 | 4/2014 |
| KR | 10-2014-0110436 | 9/2014 |

OTHER PUBLICATIONS

Written Opinion of the International Searching Authority dated Sep. 12, 2016 from International Patent Application No. PCT/KR2016/003928, 8 pages.

* cited by examiner

IMAGE FORMING APPARATUS HAVING A DOCKING UNIT TO MOUNT A PLURALITY OF PORTABLE DISPLAY APPARATUSES, A PORTABLE DISPLAY APPARATUS MOUNTABLE TO THE DOCKING UNIT, A PRINTING CONTROL METHOD USING THE DOCKING UNIT, AND A DISPLAY METHOD USING THE DOCKING UNIT

CROSS-REFERENCE TO RELATED APPLICATIONS

This application claims priority benefit from Korean Patent Application No. 10-2015-0177002, filed on Dec. 11, 2015, in the Korean Intellectual Property Office, the disclosure of which is incorporated herein by reference in its entirety.

BACKGROUND

1. Field

Apparatuses and methods disclosed herein relate to an image forming apparatus, a portable display apparatus, a printing control method, and a display method, and more particularly, to an image forming apparatus which may transmit a document to a portable display apparatus in a printing method, a portable display apparatus, a printing control method, and a display method.

2. Description of the Related Art

Image forming apparatuses generally refer to apparatuses which print printing data generated in terminal devices such as computers on recording paper. Examples of image forming apparatuses include copiers, printers, facsimile machines, or multi function peripherals (MFPs) which implement functions of the above-mentioned devices through a single device.

In recent years, with the development of ultra-slim display technology, there are various attempts to substitute mobile products such as tablets for paper as well as to enhance portability. In particular, since the paper industry scale has become larger and the added value that may be created by substituting for paper is very high, industrial solution technologies for substituting for paper documents have appeared.

However, the related-art display apparatuses such as tablets have conflicting features over paper. For example, they are too heavy to substitute for paper, expensive, fragile when they are dropped, and have a short battery lifespan. Therefore, working environments which require cooperation with paper avoid introducing display apparatuses such as tablets.

SUMMARY

Exemplary embodiments of the disclosure overcome the above disadvantages and other disadvantages not described above. Also, the disclosure is not required to overcome the disadvantages described above, and an exemplary embodiment of the disclosure may not overcome any of the problems described above.

The disclosure provides an image forming apparatus which may transmit a document to a portable display apparatus in a printing method, a portable display apparatus, a printing control method, and a display method.

According to an aspect of the disclosure, an image forming apparatus may include: a docking unit configured to mount a plurality of portable display apparatuses therein, a communication interface configured to receive data, and a processor configured to control to store the received data in at least one of the plurality of portable display apparatuses.

The image forming apparatus may further include an image former configured to print data stored in the portable display apparatuses.

The image forming apparatus may further include a scanner configured to scan a document, and the processor may be configured to store the document scanned by the scanner in at least one of the plurality of portable display apparatuses.

The docking unit may be configured to be replaced with a cassette unit which stores a plurality of sheets of printing paper.

The docking unit and the processor may be configured to exchange data with each other in a USB interface method.

The portable display apparatus may include a plurality of terminals formed at one side thereof, and the docking unit may include a plurality of pogo pins which are formed on locations corresponding to the plurality of terminals of the portable display apparatus and are electrically connected with the plurality of terminals.

The processor may be configured to determine an apparatus group to store the data, and transmit image data corresponding to the data to the portable display apparatuses corresponding to the determined apparatus group.

The image forming apparatus may further include a user manipulator configured to receive selection of a number of portable display apparatuses to store the data, and the processor may be configured to determine the apparatus group to store the data according to the selected number of portable display apparatuses.

The processor may be configured to provide information on portable display apparatuses belonging to the determined apparatus group to the determined apparatus group.

In response to the portable display apparatus being mounted in the docking unit, the processor may be configured to store data stored in the mounted portable display apparatus in at least one of a storage of the image forming apparatus and an external server.

The processor may be configured to arrange data stored in the plurality of portable display apparatuses, and store the arranged data in at least one of the storage of the image forming apparatus and the external server.

The arranged data may be at least one of data which is generated in the portable display apparatus, data which is received from other portable display apparatuses, and data which is updated reflecting a user input.

The processor may be configured to encrypt the data and store the encrypted data in at least one of the plurality of portable display apparatuses.

The processor may be configured to store security information regarding the encrypted data in at least one of the plurality of portable display apparatuses along with the encrypted data.

The security information may include at least one of information on a number of times the encrypted data is reproduced, validity date information, information on a place for reproducing.

The received data may be at least one of printing data received from a host device, a document file, and an image file.

According to another aspect of the disclosure, an image forming apparatus may include: a docking unit configured to mount a plurality of portable display apparatuses therein, a scanner configured to generate a scan image by scanning a document, and a processor configured to convert the generated scan image into image data corresponding to the portable display apparatus, and control to store the converted image data in at least one of the plurality of portable display apparatuses.

According to another aspect of the disclosure, a portable display apparatus may include: a communication interface configured to receive data and information of a group which the portable display apparatus belongs to, a display configured to display the data based on the group information, and a processor configured to, in response to a predetermined user gesture being detected, control the display to display data corresponding to the detected user gesture, and control the communication interface to transmit information on the detected user gesture to other portable display apparatuses corresponding to the group information.

The communication interface may be configured to further receive security information on the data, and the processor may be configured to determine whether the data is displayable or not based on the received security information, and control the display to display the data according to a result of the determining.

The security information may include at least one of information on a number of times the data is reproduced, validity date information, information on a place for reproducing.

The user gesture may be a gesture corresponding to a page turning command, and the processor may be configured to determine a page to be displayed based on a currently displayed page and a number of portable display apparatuses in a group in response to the page turning command, control the display to display the determined page, and control the communication interface to transmit the page turning command to other portable display apparatuses corresponding to the group information.

The user gesture may be a gesture corresponding to a page scroll command, and the processor may be configured to control the display to scroll a currently displayed page in response to the page scroll command, and display the page, and control the communication interface to transmit the page scroll command to other portable display apparatuses corresponding to the group information.

The portable display apparatus may further include a sensor configured to detect arrangements with other portable display apparatuses, and the processor may be configured to control the display to display the data based on the detected arrangements.

According to another aspect of the disclosure, a printing control method of an image forming apparatus may include: mounting a portable display apparatus in a docking unit of the image forming apparatus, receiving data, and storing the received data in the portable display apparatus mounted in the docking unit.

According to another aspect of the disclosure, a display method of a portable display apparatus may include: receiving data and information of a group which the portable display apparatus belongs to, detecting a predetermined user gesture, displaying the data in response to the detected user gesture, and transmitting information on the detected user gesture to other portable display apparatuses corresponding to the group information.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and/or other aspects of the disclosure will be more apparent by describing certain exemplary embodiments of the disclosure with reference to the accompanying drawings, in which.

DETAILED DESCRIPTION

Figure 1:
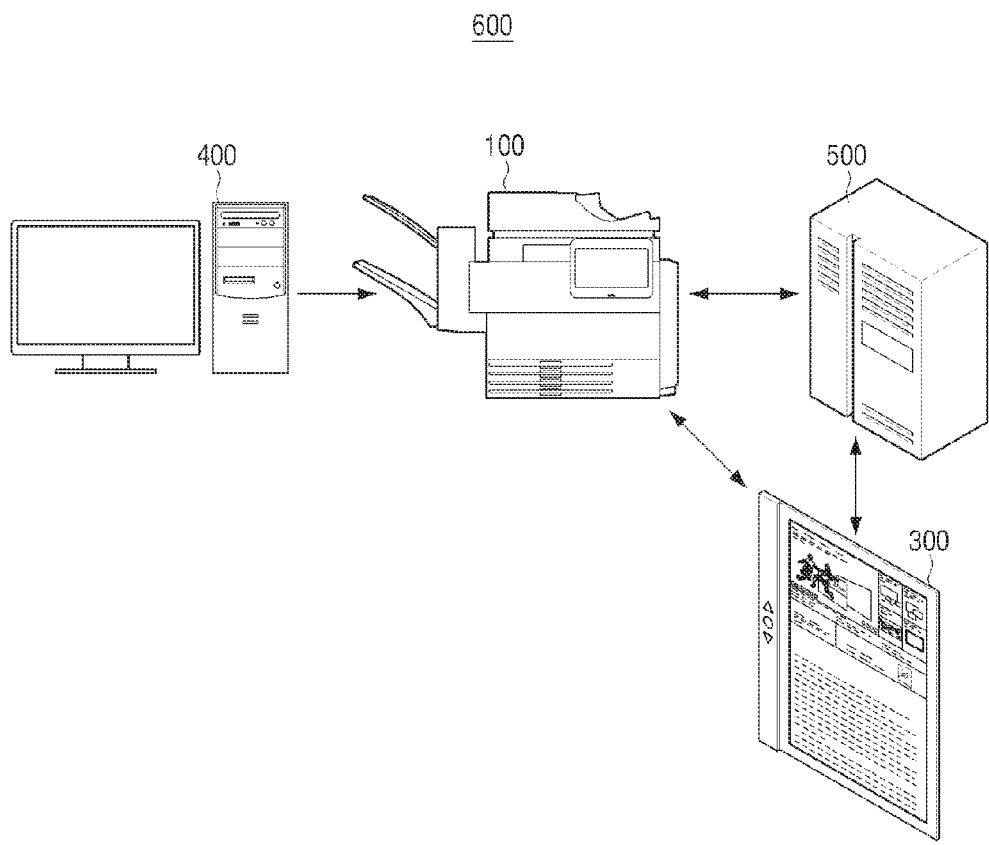
FIG. 1 is a view showing an image forming system according to an exemplary embodiment.

Although various changes may be made to the exemplary embodiments of the disclosure and various exemplary embodiments may be provided, specific exemplary embodiments will be illustrated in the drawings and will be explained in detail in the detailed description. However, various exemplary embodiments of the disclosure are not limited to the specific embodiments and should be construed as including modification, equivalent or alternative of exemplary embodiments of the disclosure. In the following description, well-known functions or constructions are not described in detail since they would obscure the disclosure in unnecessary detail.

The terms such as "first" and "second" may be used to explain various elements, and does not limit the corresponding elements. These terms may be used for the purpose of distinguishing one element from another element.

The terms used in various exemplary embodiments of the disclosure are just for the purpose of describing particular exemplary embodiments and are not intended to limit the scope of the disclosure. As used herein, the singular forms are intended to include the plural forms as well, unless the context clearly indicates otherwise. In addition, it should be understood that the terms "include" or "comprise" used in the exemplary embodiments of the disclosure are to indicate the presence of features, numbers, steps, operations, elements, parts, or a combination thereof described in the specifications, and do not preclude the presence or addition of one or more other features, numbers, steps, operations, elements, parts, or a combination thereof.

A "module" or "unit" used in the exemplary embodiments performs at least one function or operation and may be implemented by using hardware or software or a combination of hardware and software. In addition, a plurality of "modules" or a plurality of "units" may be integrated into at least one module except for a "module" or "unit" which needs to be implemented by using specific hardware and may be implemented as at least one processor (not shown).

Hereinafter, exemplary embodiments will be explained in detail with reference to the accompanying drawings.

FIG. 1 is a view showing an image forming system according to an exemplary embodiment.

Referring to FIG. 1, the image forming system 600 may include a host device 400, an image forming apparatus 100, a portable display apparatus 300, and a management server 500.

The host device 400 stores documents. The document disclosed herein may include not only a file which is directly generated in the host device 400 by a user, but also a file which is received from an external device (for example, a management server). In addition, the document may include a file which is created in a word processor, but also an image file or a moving image file such as JPEG, TIFF, BMP, etc. The document may include an XPS file and a PDF file which may perform a printing data function. The host device 400 may include not only a Personal Computer (PC) but also various electronic devices such as a smartphone, a Portable Multimedia Player (PMP), an MP3 player, etc.

In addition, the host device 400 may generate printing data regarding a document and transmit the printing data to the image forming apparatus 100. In this case, the user may select a printer driver corresponding to the image forming apparatus 100 which will perform a printing job, and the host device 400 may generate printing data corresponding to the printer driver which is selected by the user.

In the above-described example, the host device 400 converts the document into the printing data and then transmits the printing data. However, when the image forming apparatus 100 supports direct printing or a file to be printed is an XPS file which may perform a printing data function, the file may be directly transmitted to the image forming apparatus without being converted.

In case that the image forming apparatus 100 in which the portable display apparatus 300 may be mounted is connected to the host device 400, the host device 400 may be provided with a dedicated electronic paper driver for storing printing data in the portable display apparatus 300.

Such an electronic paper driver may provide a User Interface (UI) for the user to select a portable display apparatus to store a document selected by the user or select the number of portable display apparatuses to store a corresponding document. In addition, the electronic paper driver may receive a setting of security for a document selected by the user and perform a security job and encryption.

Accordingly, the user may transmit the printing data to the portable display apparatus by simply selecting the electronic paper driver instead of a normal printing driver. In this case, the user may select a portable display apparatus to store a corresponding document or may select the number of portable display apparatuses to store the corresponding document. A method for transmitting printing data in the host device 400 will be explained in detail below with reference to FIGS. 22 to 25.

The image forming apparatus 100 may have a plurality of portable display apparatuses 300 mounted therein. In addition, the image forming apparatus 100 may receive printing data from the host device 400, and print the received printing data or store the printing data in the above-described portable display apparatus 300.

In addition, the image forming apparatus 100 may scan a document and print a scan image of the document or store the scan image in the portable display apparatus 300. Such an operation may be performed by a user's manipulation on the image forming apparatus 100, and examples of user interface windows displayed in this case will be explained below with reference to FIGS. 27 to 29.

In addition, in response to the portable display apparatus 300 being mounted in the image forming apparatus 100, the image forming apparatus 100 may print data which is stored in the newly mounted portable display apparatus or may transmit the data to the external management server 500.

In this case, in response to a plurality of data being stored in the portable display apparatus 300 or a plurality of portable display apparatuses 300 being connected to the image forming apparatus 100, the image forming apparatus 100 may arrange the plurality of data and transmit the arranged data to the management server 500. The detailed configuration and function of the image forming apparatus 100 will be explained below with reference to FIGS. 2 and 3.

The portable display apparatus 300 receives and stores data. In addition, the portable display apparatus 300 may display stored data. The detailed configuration and operation of the portable display apparatus 300 will be explained below with reference to FIGS. 12 to 21.

The management server 500 receives data from the image forming apparatus 100 and stores the received data. In addition, the management server 500 may transmit stored data in response to a request of the image forming apparatus 100 or the portable display apparatus 300.

In addition, the management server 500 manages jobs performed in the image forming apparatus 100. Specifically, the management server 500 may store user information for performing a job in the image forming apparatus 100, and authenticate the user in response to a request of the image forming apparatus 100.

In addition, the management server 500 may charge for use of the image forming apparatus 100, and manage various operations of the image forming apparatus 100. That is, the management server 500 may perform a function of a typical charging server and a function of a data management server.

According to the exemplary embodiment described above, the image forming system 600 may transmit a document to the portable display apparatus 300 by simply changing a driver in a normal printing method, so that the user may easily transmit data to the portable display apparatus 300.

Although a single host device 400, a single image forming apparatus 100, and a single portable display apparatus 300 are illustrated in FIG. 1, the host device may be connected to a plurality of image forming apparatuses and the single image forming apparatus may be connected to a plurality of host devices.

In addition, the image forming apparatus 100 may be connected with a plurality of portable display apparatuses and may be connected with a plurality of management servers 500. In addition, although the management server 500 is connected only with the image forming apparatus 100 and the portable display apparatus 300, the management server 500 may be connected with the host device 400.

In addition, although the respective devices are directly connected with one another in FIG. 1, a router or a sharer may be disposed between the devices in practice and the devices may be connected with one another wirelessly and/or in a wired manner.

In addition, although the image forming system 600 may include both the host device 400 and the management server 500 in FIG. 1, the image forming system 600 may include only the host device 400 or only the management server 500 in practice.

Figure 2:
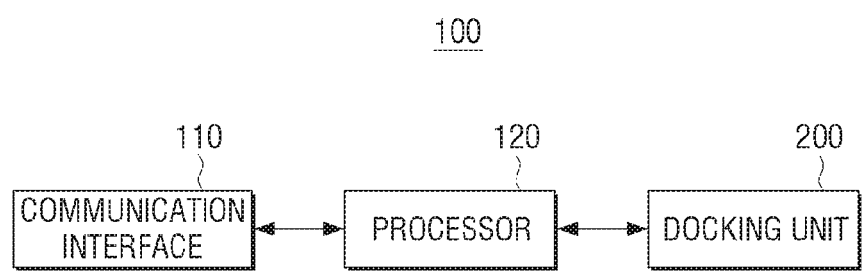
FIG. 2 is a block diagram showing a simple configuration of the image forming apparatus of FIG. 1.

FIG. 2 is a block diagram showing a simple configuration of the image forming apparatus of FIG. 1.

Referring to FIG. 2, the image forming apparatus 100 according to an exemplary embodiment may include a communication interface 110, a processor 120, and a docking unit 200. The image forming apparatus 100 may be a scanner, a copier, a facsimile machine, or a Multi Function Peripheral (MFP) which complexly implements two or more of the functions of the above-mentioned devices through a single device.

The communication interface 110 may be connected with the host device 400, such as a PC, a laptop PC, a PDA, a digital camera, etc., to receive a document from the host device 400 or transmit a scan image (or an image file) scanned in the image forming apparatus 100 to the host device 400. Herein, the received document may be printing data which is generated by converting a document in the host device or may be a document itself (for example, a document file or an image file).

Specifically, the communication unit 110 may be configured to connect the image forming apparatus 100 to an external device, and may be connected to a terminal through a Local Area Network (LAN) and the Internet and also may be connected to the terminal through a Universal Serial Bus (USB) port or a wireless port (for example, WiFi, Bluetooth, IEEE, Zigbee, $3^{rd}$ Generation (3G), $3^{rd}$ Generation Partnership Project (3GPP), Long Term Evolution (LTE), etc.).

In addition, the communication interface 110 may receive a command related to the control of the image forming apparatus 100, such as a print command, a scan command, etc., from the host device 400. In this case, the communication interface 110 may receive printing data corresponding to the print command. Herein, the scan command may include not only a control command including only a scanning process but also a control command such as a copy command including the scanning process, a faxing command, scan-to-server, scan-to-mobile, etc.

In addition, the communication interface 110 may receive a relay command to store printing data in the portable display apparatus. In addition, the communication interface 110 may receive printing data in response to a corresponding print command.

Herein, the relay command may include the number of portable display apparatuses to store corresponding printing data, information on a portable display apparatus to store corresponding printing data, group information, display type information of corresponding printing data, and security information.

In addition, the group information may be information on portable display apparatuses which belong to a job group designated by the user, and may include respective serial numbers (for example, display IDs) of the portable display apparatuses.

In addition, the display ID is a serial unique number which is assigned to a single panel. In addition, the security information may include an encryption method, public key information (or individual key information), information on the number of times transmitted data is reproduced, validity date information of corresponding data, information on where corresponding data is reproducible.

In addition, the communication interface 110 may transmit data which is stored in a storage 150 (for example, a scan image or an image file transmitted from the portable display apparatus 300) to the host device 400 or the management server 500.

Herein, the scan image may be an image which is generated by scanning a document in a scanner, and the image file may be an image file which combines generated images on a job basis, like PDF, TIFF, and JPG. In the above-described example, for convenience of explanation, it is assumed that the image file may include a plurality of pages, that is, a plurality of scan images. However, the image file may include only a single scan image.

In addition, the communication interface 110 may be connected with the portable display apparatus wirelessly and may maintain a link. In addition, the communication interface 110 may wirelessly transmit security information and contents.

The processor 120 controls the elements in the image forming apparatus 100. Specifically, the processor 120 may control the overall operation of the image forming apparatus 100 using various programs stored in the storage 150. For example, the processor 120 may include a Central Processing Unit (CPU), a Random Access Memory (RAM), a Read Only Memory (ROM), and a system bus.

In response to printing data being received through the communication interface 110, the processor 120 may control to store the received printing data in at least one of the plurality of portable display apparatuses. In this case, the processor 120 may perform this operation with respect to only an authenticated user. Such authentication may be performed by tagging a tag including user authentication information with an NFC reader.

Specifically, in response to the relay command to store the printing data in the portable display apparatus 300 being received from the host device 400, the processor 120 may transmit the printing data to the portable display apparatus 300 corresponding to the relay command.

For example, in response to the relay command including apparatus group information for storing printing data in the plurality of portable display apparatuses, or the number of portable display apparatuses to store the printing data being selected, the processor 120 may determine a group of apparatuses to store the printing data and transmit the printing data to the portable display apparatuses corresponding to the determined apparatus group.

In this case, the processor 120 may provide information on the portable display apparatuses belonging to the corresponding group to the portable display apparatuses belonging to the determined apparatus group. Herein, the information may be information which is necessary for pairing the plurality of portable display apparatuses with one another, and may be serial information (or display IDs) of the portable display apparatuses belonging to the corresponding group.

In the above-described example, the same printing data may be repeatedly transmitted to the portable display apparatuses. However, in practice, only page data corresponding to each of the portable display apparatuses in the printing data may be individually transmitted.

In addition, in response to a document being scanned through a scanner 160, the processor 120 may transmit the scanned document data to the portable display apparatus according to user manipulation on a user manipulator 140.

In transmitting document data, the processor 120 may encrypt printing data and transmit the encrypted printing data to the portable display apparatus. Specifically, the processor 120 may encrypt the printing data and transmit the encrypted printing data to the portable display apparatus along with information related to security. For example, the processor 120 may encrypt the document in a public key/individual key encryption method using one piece of information on the image forming apparatus as a public key and using one piece of information on the portable display apparatus (for example, the display ID) as an individual key.

For example, in response to corresponding printing data being set to be reproduced a predetermined number of times, the processor 120 may transmit information on the predetermined number of times of reproducing to the portable display apparatus as security information with the corresponding printing data.

In addition, in response to corresponding printing data being set to be reproduced only in a specific space (for example, in a distance where the image forming apparatus is connectable in the Bluetooth method), the processor 120 may transmit space information (or information of an apparatus which should be continuously connected) to the portable display apparatus 300 as security information. In this case, the portable display apparatus may continuously maintain wireless connection with a specific apparatus according to the transmitted information, and may stop displaying contents in response to the wireless connection being interrupted.

In practice, in addition to the above-described information, the processor 120 may transmit a validity date of printing data, user authorization information (information of a user authorized to see a transmitted content), etc. to the portable display apparatus as security information.

In addition, the processor 120 may convert the received printing data and scan data into a format recognizable by the portable display apparatus 300. For example, when received printing data is an XPS file or it is impossible to display the XPS file on the connected portable display apparatus 300, the processor 120 may convert the corresponding printing data into a format which is recognizable by the portable display apparatus 300.

In addition, in the above-described converting process, the processor 120 may convert the file to correspond to a layout selected by the user. For example, in response to the received printing data having a portrait layout but the user selects a landscape layout, the processor 120 may convert the printing data into the layout format selected by the user.

In addition, in response to the portable display apparatus 300 being mounted in the docking unit 200, the processor 120 may print or store data which is stored in the portable display apparatus 300, or may transmit the data to the management server 500 according to user manipulation or a pre-registered process.

In this case, in response to a plurality of data being received from the plurality of portable display apparatuses 300 or a plurality of data being received from a single portable display apparatus 300, the processor 120 may arrange the received data and transmit the arranged data to the management server 500.

In addition, the processor 120 may arrange data received from the plurality of portable display apparatuses in a predetermined method and transmit the arranged data to the plurality of portable display apparatuses.

All of the data stored in the portable display apparatuses may be arranged, but in practice, only the data generated in the portable display apparatuses, data received from other portable display apparatuses, and data updated reflecting a user input may be arranged.

The docking unit 200 may have the plurality of portable display apparatuses mounted therein. Specifically, the docking unit 200 may be configured to be compatible with a cassette unit which stores a plurality of sheets of printing paper, and may exchange data with the above-described processor 120 in a USB interface method.

In this case, the docking unit 200 may exchange data with the plurality of portable display apparatuses in the USB interface method. Accordingly, from the perspective of communication, the docking unit 200 may perform a function like a USB hub. The detailed arrangement and operation of the docking unit 200 will be explained below with reference to FIGS. 4 to 10.

According to the exemplary embodiments described above, since the image forming apparatus may convert the received printing data to be suitable to the portable display apparatus and store the printing data, the user may easily transmit data necessary for the portable display apparatus.

Although the simple configuration of the image forming apparatus is illustrated and explained in the above-described description, various elements may be additionally provided in practice. This will be explained below with reference to FIG. 3.

Figure 3:
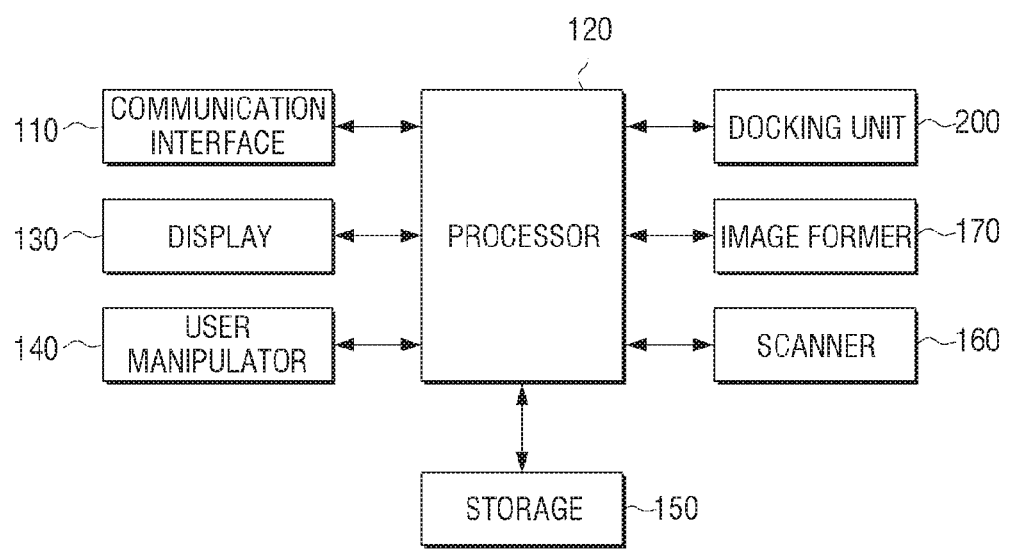
FIG. 3 is a block diagram showing a detailed configuration of the image forming apparatus of FIG. 1.

FIG. 3 is a block diagram showing a detailed configuration of the image forming apparatus of FIG. 1.

Referring to FIG. 3, the image forming apparatus 100 according to an exemplary embodiment may include a communication interface 110, a processor 120, a display 130, a user manipulator 140, a storage 150, a scanner 160, an image former 170, and a docking unit 200.

The functions of the communication interface 110, the processor 120, and the docking unit 200 are the same as the functions of the elements of FIG. 2 and thus a redundant explanation thereof is omitted.

The display 130 displays a variety of information provided by the image forming apparatus 100. Specifically, the display 130 may display a function of the image forming apparatus which is selectable by the user or display a screen for selecting an option corresponding to a function selected by the user.

For example, when the function selected by the user is a function of storing a content in the portable display apparatus 300, the display 130 may display information on the portable display apparatus which is able to store the selected content, and a UI for selecting a storage method. The display 130 may be implemented by using a monitor such as a Cathode Ray Tube (CRT), a Liquid Crystal Display (LCD), an Active Matrix Organic Light Emitting Diode (AMO-LED), and may be combined with the function of the user manipulator 140 to be implemented as a touch screen.

The user manipulator 140 may be provided with a plurality of functions keys for the user to set or select various functions supported by the image forming apparatus 100. Accordingly, the user manipulator 140 may receive selection of a function to be performed in the image forming apparatus 100 and an option for the corresponding function from the user. The user manipulator 140 may be implemented by using an input device such as a plurality of buttons, a mouse, etc., and may be combined with the above-described display 130 to be implemented as a touch screen.

For example, the user manipulator 140 may receive an input of a copy command. In this case, the user may select electronic paper rather than A4, letter, etc. as printing paper. In response to the user selecting the electronic paper, that is, EPD copy being selected, the processor 120 may store data which is scanned by the scanner 160 in the portable display apparatus 300.

The storage 150 may store a program for configuring various screens to be displayed on the above-described user interface and an Operating System (OS) and an application program for the operations of the image forming apparatus 100. The OS is configured to control and manage the overall operations of hardware.

The storage 150 stores an image file. Specifically, the storage 150 may store a scan image which is generated by the scanner 160, which will be described below, or may store an image file which is generated by combining scan images on a job basis. In addition, the storage 150 may store printing data which is received through the communication interface 110. In addition, the storage 150 may store data which is received from the portable display apparatus 300.

The storage 150 may be implemented by using a storage medium provided in the image forming apparatus 100 (for example, a flash memory, a Hard Disk Drive (HDD), or a Solid State Driver (SSD)), and an external storage medium such as a removable disk including a USB memory, a storage medium connected to a host, and a web server through a network.

The scanner 160 generates a scan image by scanning a document. Specifically, the scanner 160 may include a light emitter (not shown) to emit light to a document, a lens unit (not shown) to focus light reflected from the document onto an image sensor provided in the scanner 160, the image sensor, etc, and reads out image information of the document from the light focused onto the image sensor.

The scanner 160 may be a device which scans a document laid on a flatbed, a device which scans a single surface or both surfaces of a document fed to an Auto Document Feeder (ADF), or a device which combines the two devices. The scanner 160 may generate a single file by combining a plurality of scan images which are continuously scanned in the ADF.

The image former 170 prints printing data on printing paper. Specifically, the image former 160 may print received printing data on the printing paper in one of the ink jet method, the dot jet method, and the laser printer method. In this case, the printing data may be data which is received through the communication interface 110, scan data which is generated in the scanner 160, and data which is transmitted from the portable display apparatus mounted in the docking unit 200.

According to the above-described exemplary embodiment, since the image forming apparatus 100 may transmit contents to the portable display apparatus in the normal printing method or copying method, the user may easily transmit desired data to the portable display apparatus and thus user convenience may be enhanced.

In addition, in response to the portable display apparatus being mounted in the image forming apparatus 100, data stored in the portable display apparatus may be automatically printed or transmitted to a predetermined storage, and thus user convenience may be enhanced.

FIGS. 4 to 7 are views to illustrate various arrangements of the docking unit.

Figure 4:
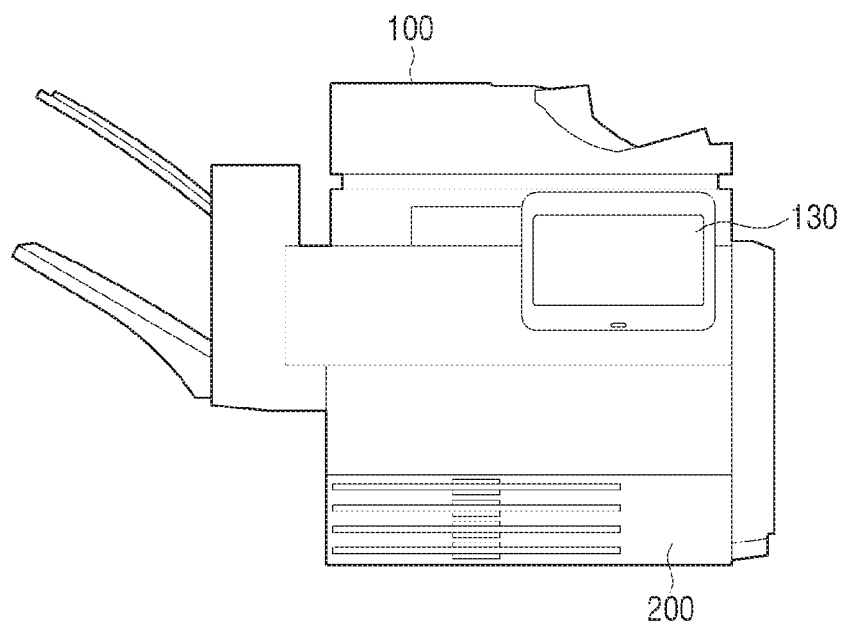
FIGS. 4 to 7 are views to illustrate various arrangements of docking unit.

Specifically, FIG. 4 is a view to illustrate an example of the docking unit which is disposed to be compatible with a cassette unit.

In a typical image forming apparatus, a paper storage cassette unit for storing printing paper is disposed at a lower end of a body. In particular, a medium or large size image forming apparatus may be provided with a plurality of paper storage cassette units.

According to an exemplary embodiment, the image forming apparatus 100 uses one of the related-art paper storage cassette units as the docking unit 200.

Accordingly, the docking unit 200 may have a shape compatible with the cassette unit and include a plurality of slots for mounting the plurality of portable display apparatuses therein. The detailed configuration and shape of the docking unit 200 will be explained below with reference to FIGS. 9 and 10.

According to the above-described exemplary embodiment, since the docking unit 200 is compatible with the related-art cassette unit, the user may implement the image forming apparatus as in the disclosure by simply replacing the related-art paper storage cassette unit with a cassette unit supporting the portable display apparatuses.

In FIG. 4, only the four slots are arranged in the docking unit 200. However, in practice, the docking unit 200 may be implemented to have three or less or five or more slots. In addition, the slots are arranged in a width direction, but the plurality of slots may be arranged in a height direction.

Figure 5:
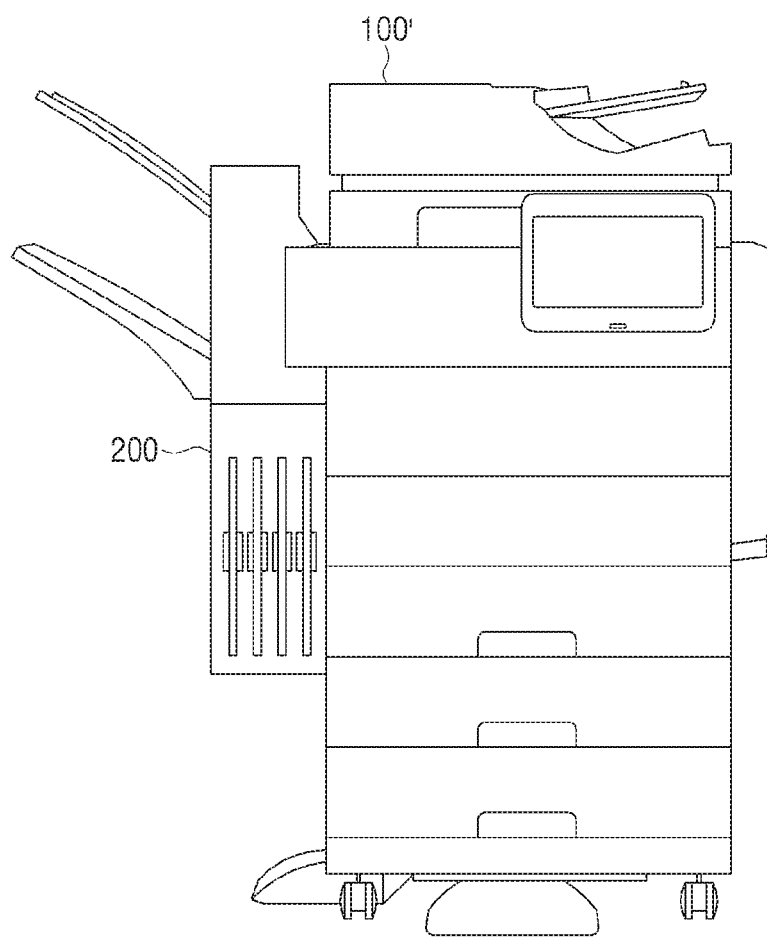
Figure 6:
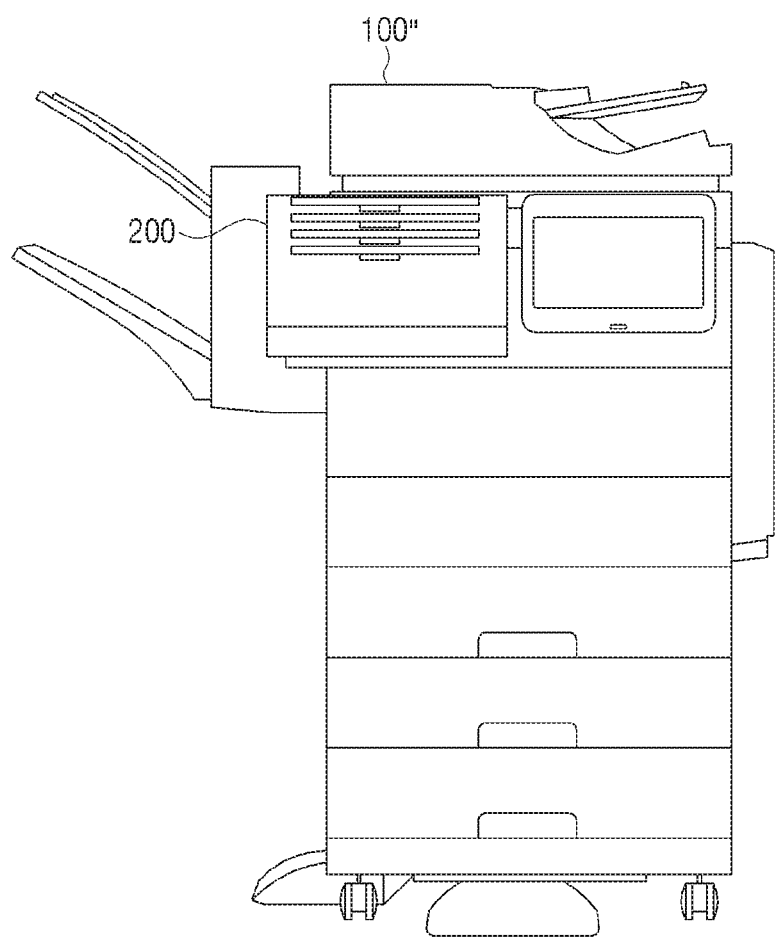

FIGS. 5 and 6 are views showing examples of the docking unit which is disposed on the periphery of an image forming apparatus.

Referring to FIG. 5, the image forming apparatus 100' may include the docking unit 200 which is disposed on the side surface of the body. Herein, the side surface may be a space where a related-art paper sorter is disposed.

Referring to FIG. 6, the image forming apparatus 100″ may include the docking unit 200 which is disposed on the front surface of the body.

In the exemplary embodiments of FIGS. 5 and 6, the docking unit 200 does not occupy the space of the paper storage cassette unit and thus the paper storage capacity of the related-art image forming apparatus may be maintained.

Figure 7:
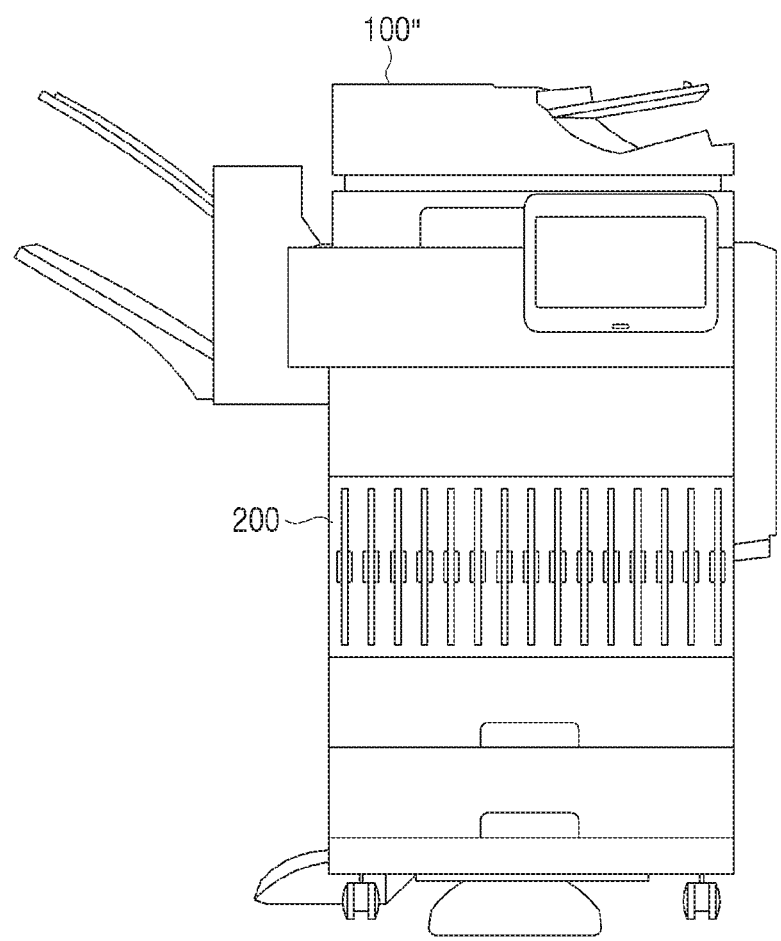

FIG. 7 is a view to illustrate another example of the docking unit which is disposed to be compatible with the cassette of the image forming apparatus.

As described above, the medium or large size image forming apparatus may have the plurality of paper storage cassette units arranged therein. The plurality of various paper storage cassette units may be arranged for the purpose of supporting printing paper of various sizes without replacing the cassettes. However, when the plurality of paper storage cassette units are provided to support the printing paper of various sizes, normal users use printing paper of an A4 or letter size most frequently.

In this case, a recent image forming apparatus may have a large size cassette unit having a height higher than those of other cassette units. This cassette unit may be higher than the height of the portable display apparatus. In this case, the docking unit 200 may include slots formed in the height direction to have the portable display apparatuses mounted therein, and accordingly, more slots than in FIG. 4 may be arranged.

Figure 8:
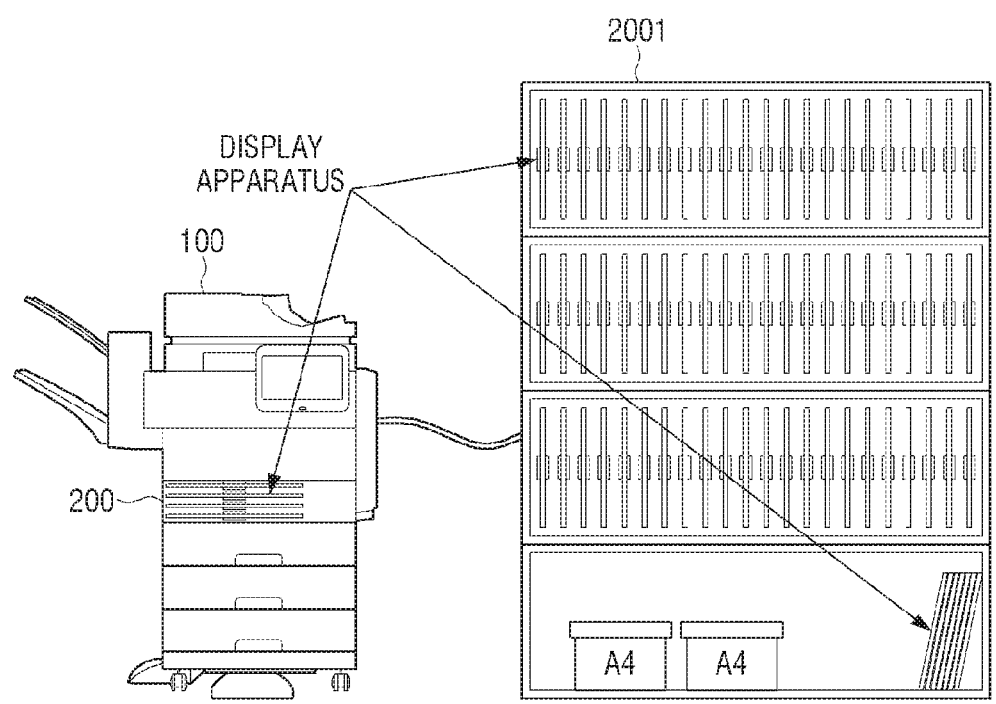
FIG. 8 is a view to illustrate a docking device which is formed separately from the image forming apparatus.

FIG. 8 is a view to illustrate a docking device which is formed separate from the image forming apparatus.

Referring to FIG. 8, the docking device 2001 may be located at a distance from the image forming apparatus 100. In addition, the docking device 2001 may have a bookshelf shape such that a plurality of slots are formed on a plurality of layers. The portable display apparatuses may be mounted in these slots.

In addition, a display device may be disposed at one side of each of the slots to display the portable display apparatus storing user data. In the illustrated example, the docking device 2001 of three rows is illustrated. However, the docking device 2001 may be implemented to have one row, two rows, or four or more rows.

Such a docking device 2001 may be provided in a business like an insurance company where many users exist or a school where many students exist.

In addition, in the illustrated example, the image forming apparatus and the docking device 2001 may be connected with each other through a wire. However, in practice, the image forming apparatus and the docking device 2001 may be connected with each other wirelessly.

Figure 9:
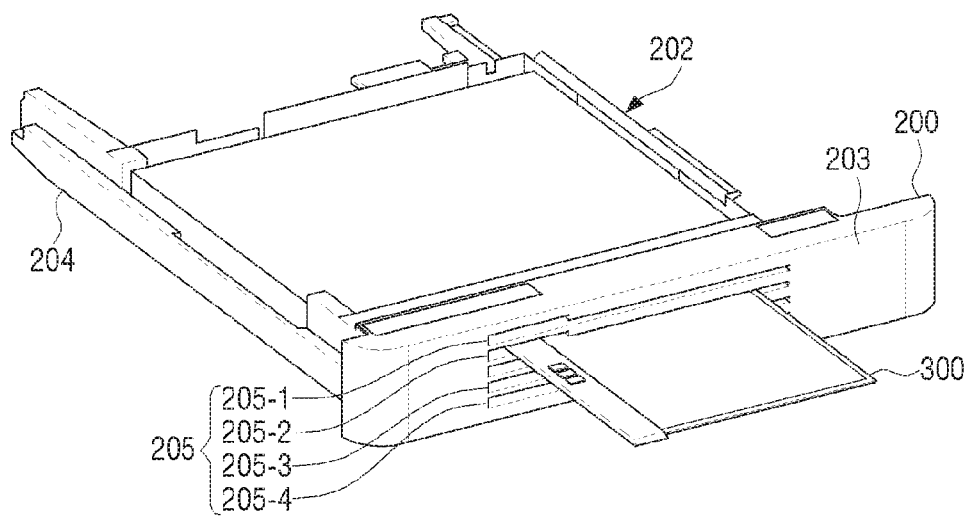
FIG. 9 is a view to illustrate the docking unit of FIG. 4 in detail.

FIG. 9 is a view to illustrate the docking unit of FIG. 4 in detail.

Referring to FIG. 9, the docking unit 200 may include a body 202 which is compatible with a paper storage cassette unit. A paper feeding box insertion guide 204 may be disposed on the side surface of the body 202.

In addition, a panel 203 and a plurality of slots 205 (e.g., 205-1, 205-2, 205-3), and 205-4 are formed on the front surface of the body 202.

The panel 203 is a display device for displaying a portable display apparatus selected by the user.

The plurality of slots 205-1, 205-2, 205-3, and 205-4 are configured to have the portable display apparatuses mounted therein. Specifically, the portable display apparatus may be inserted into one of the plurality of slots in a sliding method. In this case, the portable display apparatus may include a plurality of terminals. The docking unit 200 may include pogo pins which are arranged to be connected with the plurality of terminals of the portable display apparatus in response to the portable display apparatus being mounted. This configuration will be explained below in detail with reference to FIG. 21.

Figure 10:
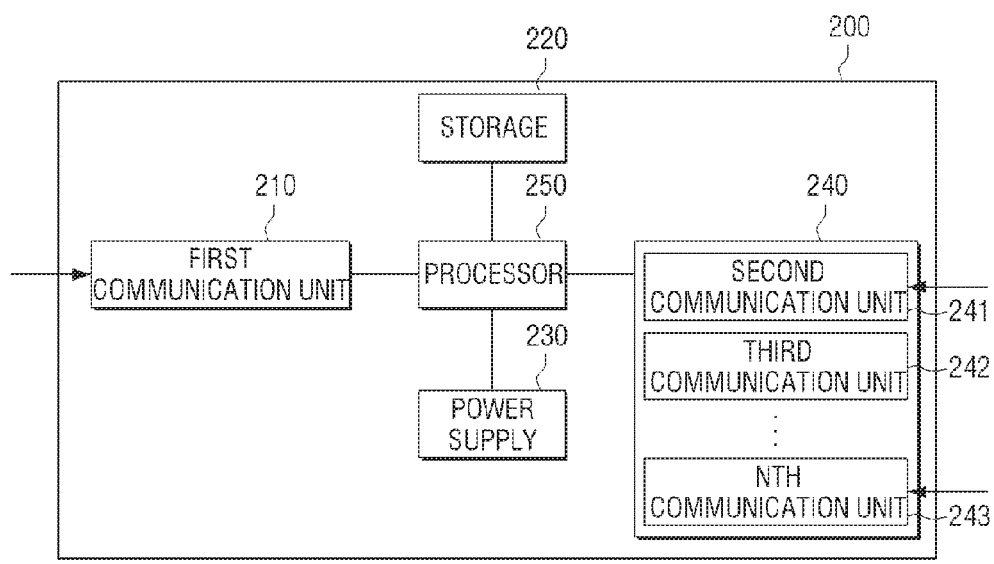
FIG. 10 is a block diagram showing a detailed configuration of the docking unit of FIG. 4.

FIG. 10 is a block diagram showing a detailed configuration of the docking unit of FIG. 4.

Referring to FIG. 10, the docking unit 200 may include a first communication unit 210, a storage 220, a power supply 230, a plurality of second communication units 240 (e.g., second communication unit 241, third communication unit 242, through n-th communications units 243), and a processor 250.

The first communication unit 210 may be connected with the body (specifically, the processor 120) of the image forming apparatus 100. In addition, in practice, the first communication unit 210 may be directly connected to the host device 400 such as a PC. The first communication unit 210 may transmit and receive data in the USB interface method.

The storage 220 may store a command to operate the processor 250 which will be described below, and temporarily store data which is generated in the processor 250.

The power supply 230 supplies power to the elements of the docking unit 200. The power supply 230 may use a small battery power source or may use a power source of an external device (specifically, the image forming apparatus). In response to the portable display apparatus being mounted, the power supply 230 may supply power to charge a secondary power source of the portable display apparatus 300.

The plurality of second communication units 240 may be connected with the portable display apparatuses to transmit data (for example, an image file such as PNG, JPG, GIF, or BMP) received through the first communication unit 210 to the portable display apparatuses. The second communication units 240 may transmit and receive data in the USB interface method.

In this case, the plurality of second communication units 240 may also transmit group information and security information corresponding to the transmitted data.

In addition, the plurality of second communication units 240 may receive data stored in the portable display apparatuses. In this case, the second communication unit 240 may receive file information such as a name, a size, and a storage date of a file stored in the portable display apparatus in advance prior to receiving data stored in the portable display apparatus. In practice, the second communication unit 240 may support wireless communication such as WiFi, Bluetooth, Infrared Data Association (IrDA), Near Field Communication (NFC) as well as wire communication methods.

In response to image data being received from the first communication unit 210, the processor 250 may transmit a command to drive a display processor to the display processor along with the image data. However, in response to the format of the image data received from the first communication unit 210 being different from a format supported by the portable display apparatus, the processor 250 may convert the received image data into the format supported by the corresponding portable display apparatus, and transmit the converted image data with a command to drive the portable display apparatus.

In the above-described example, the docking unit 200 converts the format of the received data, but in practice, the image forming apparatus may convert the format of the data.

Figure 11:
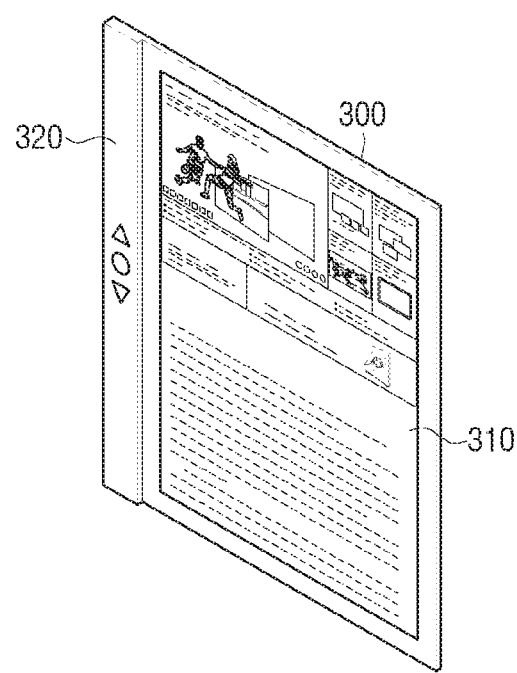
FIG. 11 is a view showing a portable display apparatus according to an exemplary embodiment.

FIG. 11 is a view showing a shape of a portable display apparatus according to an exemplary embodiment.

Referring to FIG. 11, the portable display apparatus 300 may include a display 310 and a main board 320.

The display 310 displays a stored content. Specifically, the display 310 displays a stored content. Herein, the displayed content may include a menu screen, a still image, and a document (an e-book, a digital newspaper, a web page, etc.). The display 310 may be formed by using an LCD and an electrophoresis display (EPD) panel which is an example of electronic paper.

The EPD panel may include a cover sheet to protect other elements in the EPD panel, an imaging sheet to display a content, a driver to drive the imaging sheet and a sensor according to a control signal, and the sensor to detect a user's touch.

The cover sheet forms the outer surface of the EPD panel with the top surface of the imaging sheet to protect other elements in the EPD panel, and may be formed of synthetic resin or plastic such as polyimide, polyethylene terephthalate (PET), etc.

The imaging sheet may have a structure in which pixels having the same configuration are arranged in an N*M matrix pattern. That is, an image displayed on the screen of the imaging sheet is formed of a set of points displayed by the above-described pixels. The detailed configuration of the imaging sheet will be explained below with reference to FIG. 12. In the above-described example, the display and the imaging sheet are separate elements. However, the function of displaying an image is performed by the imaging sheet and thus the imaging sheet may be referred to as the display.

In response to the portable display apparatus 300 being mounted in the docking unit 200, the main board 320 may receive a content through the docking unit 200. Herein, the content may be data of a format which is directly displayable on the portable display apparatus, a printing data format, or an encrypted file format.

The main board 320 controls the display 310 to display a stored content. The detailed configuration and operation of the main board 320 will be explained below with reference to FIG. 13.

Figure 12:
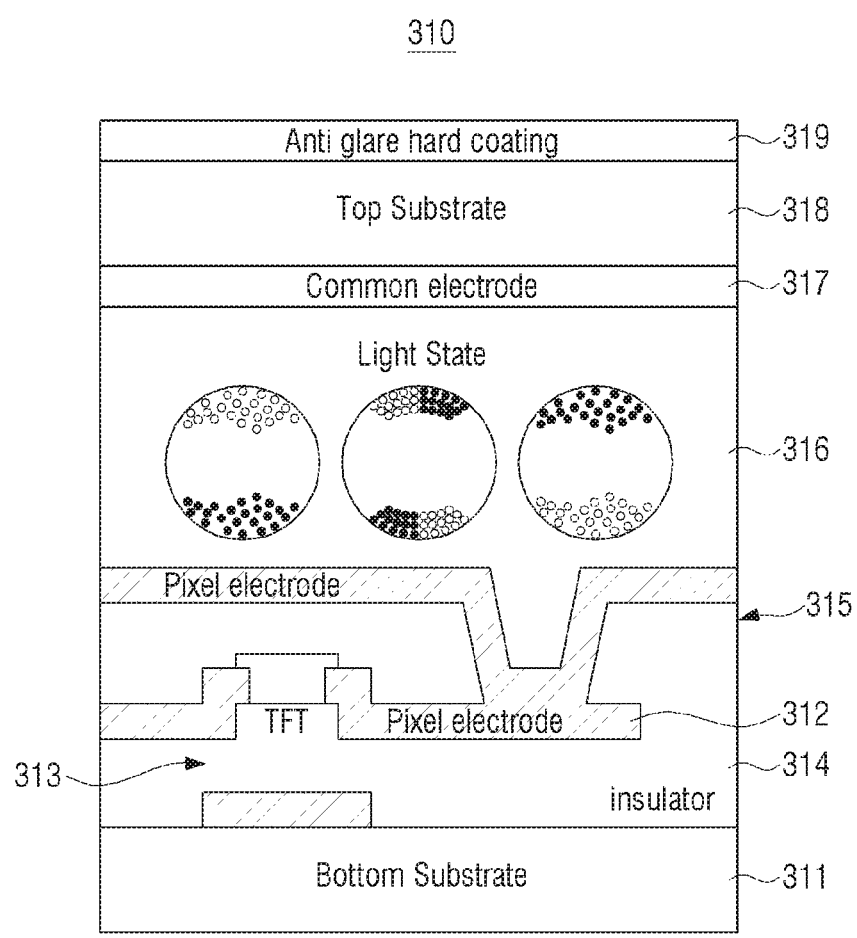
FIG. 12 is a cross section view showing one pixel of a display of FIG. 11.

FIG. 12 is a cross section view showing one pixel of the display of FIG. 11.

Referring to FIG. 12, materials and thickness of the elements of the display 310 may be set such that the display 310 is flexible and thin. In addition, the display 310 may be illuminated by ambient light from the outside and may display a content by reflecting or absorbing light.

The display 310 may include a bottom substrate 311, an organic electronics backplane 315, an ink layer 316, a common electrode layer 317, a top substrate 318, and a hard coating layer 319, which are stacked in sequence.

The bottom and top substrates 311 and 318 may protect the ink layer 316 and the electrode layers 315 and 317, and the substrates may be formed of a film of synthetic resin or plastic such as polyimide, PET, etc. to guarantee a heat-resisting property, high transmissivity, and a good sense of handwriting. The bottom substrate 311 may have thickness of 20-30 μm.

The hard coating layer 319 may be stacked on the top surface of the top substrate 318 and may have an antiglare function. For example, the hard coating layer 319 may be formed of material in which a light diffusion agent is added to typical hard coating material. The hard coating layer 319 may be selectively applied to the top substrate 318, and the hard coating layer 319 and the top substrate 318 may have thickness of 24-36 μm.

The ink layer 316 may represent a color or monochrome image pattern through movement of particles according to an applied electric field (that is, an electrophoresis phenomenon), and display an image by reflecting or absorbing external light entering the pattern. For example, the ink layer 316 may include microcapsules which are charged with a transparent liquid containing white and black particles, and are arranged between the organic electronics backplane 315 and the common electrode 317, and display the black or white image pattern by applying an electric field to the microcapsules. For example, since the white particle is charged with (+) and the black particle is charged with (−), the particles are moved in the opposite directions according to the applied electric field.

The image pattern of the ink layer 316 may be maintained until the electric field is changed. The ink layer 316 may display a color image pattern. To display color, a color filter may be staked on the ink layer 316 or coloring particles may be used instead of the monochrome particles as particles forming the ink layer 316.

The common electrode layer 317 may be arranged between the ink layer 316 and the top substrate 318, maintain a uniform electric potential, and may be connected to the ground. The common electrode layer 317 and the ink layer 317 may have a thickness of 32-48 μm.

The organic electronics backplane 315 may be divided into a plurality of pixels, and each of the pixels may include a pixel electrode 312 and a thin film transistor (TFT) 313 a part or entirety of which is embedded in an insulation layer 314 or is stacked on the top surface of the insulation layer 314.

The common electrode layer 317 and conducting parts of the organic electronics backplane 315 like the pixel electrode 312 and the TFT 313 may be formed of carbon-containing organic material, and such organic material may be graphene, for example. The organic electronics backplane 315 may have thickness of 4-6 μm.

The total thickness of the display 310 may be 0.08-0.2 mm, and preferably, may be 0.09-0.11 mm. The display 310 may form a single electronic paper and the electronic paper may have a thickness of 0.08-0.2 mm, and preferably, may have thickness of 0.09-0.11 mm.

Figure 13:
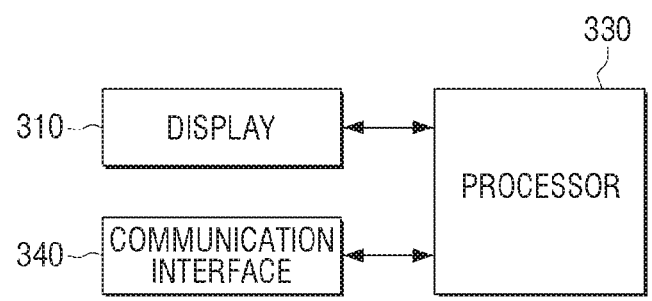
FIG. 13 is a block diagram showing a simple configuration of the portable display apparatus according to an exemplary embodiment.

FIG. 13 is a block diagram schematically showing a configuration of a portable display apparatus according to an exemplary embodiment.

Referring to FIG. 13, the portable display apparatus 300 may include a communication interface 340, a display 310, and a processor 330.

The communication interface 340 may be connected with the image forming apparatus 100 to receive printing data (or image data) from the image forming apparatus 100. Specifically, the communication interface 340 may be configured to connect the portable display apparatus 300 with an external device, and may connect to a terminal device through a LAN and Internet and also connect to the terminal device through a USB port or a wireless port (for example, WiFi, Bluetooth, IEEE, Zigbee, 3G, 3GPP, LTE, etc.).

In addition, the communication interface 340 may receive information on a group to which the portable display apparatus 300 belongs. Herein, the group information may be information on a portable display apparatus which belongs to a job group designated by the user, and may include serial numbers (for example, display IDs) of the portable display apparatuses.

In addition, the display ID may be a serial number which is assigned to a single panel.

In addition, the communication interface 340 may receive security information. Herein, the security information may include an encryption method, public key information (or individual key information), information on the number of times transmitted data is reproduced, validity date information of corresponding data, information on where corresponding data is reproducible.

In addition, the communication interface 340 may be connected with the image forming apparatus 100 wirelessly and may maintain a wireless link. In practice, only in the state in which the wireless link is maintained, a display operation which will be described below may be performed. Herein, the wireless link is direct wireless connection and refers to wireless communication such as WiFi Direct, Bluetooth, etc.

The display 310 displays printing data based on the group information. The detailed configuration and operation of the display 310 have been described above with reference to FIGS. 11 and 12, and a redundant explanation thereof is omitted.

The processor 330 controls the elements of the portable display apparatus 300. Specifically, the processor 330 may authenticate the user and control the display 310 to display pre-stored data only for the authenticated user.

In addition, in response to a stored content being encrypted, the processor 330 may decrypt the content based on the received security information.

In addition, the processor 330 may understand an arrangement relationship with the other portable display apparatus in the group, determine a page to be displayed according to the understood arrangement relationship, and display the determined page. For example, in response to the job group including two portable display apparatuses and the other portable display apparatus being disposed on the left of the corresponding portable display apparatus, the corresponding portable display apparatus may determine to display an even page and display the second page of printing data when initially displaying the printing data.

In addition, the processor 330 may detect a user gesture. Specifically, the processor 330 may detect a page turning gesture (for example, a gesture of moving a touch/flicking to the left or right of a screen) or a scroll gesture (for example, a gesture of moving a touch downwardly or upwardly on the screen) on the display 310.

The processor 330 may control the display to display printing data corresponding to the detected user gesture. Specifically, in response to the user's touch gesture being a page turning command, the processor 330 may determine a page to be displayed based on a currently displayed page and the number of portable display apparatuses in the group, and control the display 310 to display the determined page. For example, in response to the job group including two portable display apparatuses and a touch movement to the right of the screen being detected while page 2 is being displayed, the processor 330 may determine to turn the right page and turn to page 4.

In response to the user's touch gesture being a page scroll command, the processor 330 may control the display 310 to scroll the currently displayed page according to the page scroll command and display the page.

In addition, the processor 330 may control the communication interface 340 to transmit information on the detected user gesture to the other portable display apparatuses corresponding to the group information. Accordingly, the plurality of portable display apparatuses in the job group may perform operations associated with the single touch gesture.

According to the above-described exemplary embodiment, since the portable display apparatus receives information on the portable display apparatuses to be operated therewith along with printing data, the user may easily pair the plurality of display apparatuses. In addition, since the plurality of display apparatuses paired with one another provide various interactions to the user, user convenience may be enhanced. In the above-described example, the configuration of the portable display apparatus has been schematically illustrated and explained, but the portable display apparatus may further include other elements in addition to the above-described elements. This will be explained below with reference to FIG. 14.

In the following description, the term "touch input" refers to a touch gesture which is performed by a user on a display and a cover to control a device. In addition, the "touch input" may include a touch which is not in contact with the display and is distanced away from the display by more than a predetermined distance (for example, floating or hovering). The touch input may include a touch & hold gesture, a tap gesture which touches and then removes the touch, a double tap gesture, a panning gesture, a flick gesture, and a touch and drag gesture which touches and then moves in one direction while still touching, a pinch gesture, and the like, but is not limited to these.

Figure 14:
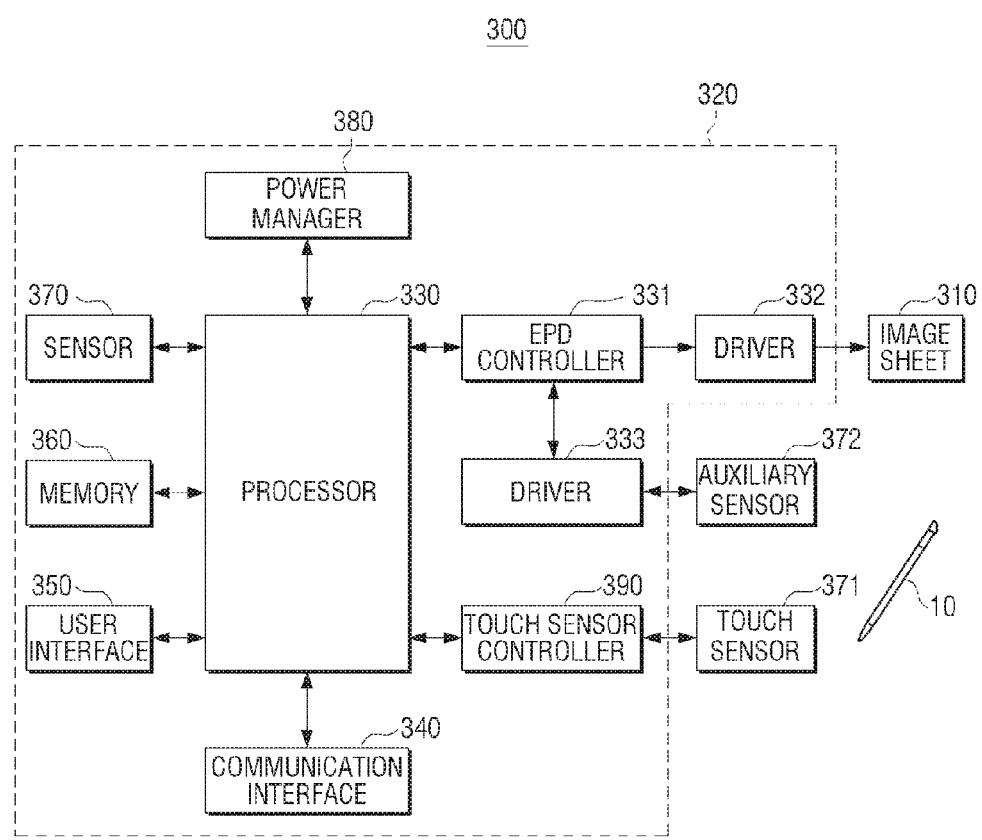
FIG. 14 is a block diagram showing a detailed configuration of the portable display apparatus according to an exemplary embodiment.

FIG. 14 is a block diagram showing a detailed configuration of a portable display apparatus according to an exemplary embodiment.

Referring to FIG. 14, the portable display apparatus 300 may include a display 310, a main board 320, a touch sensor 371, and an auxiliary sensor 372.

The display 310 displays a stored content and may include an image sheet. The display and the image sheet have been described above in detail with reference to FIGS. 11 and 12, and thus a redundant explanation thereof is omitted.

The main board 320 may include a processor 330, an EPD processor (controller) 331, first and second driver 332 and 333, a communication interface 340, a user interface 350, a memory 360, a sensor 370, a power manager 380, and a touch sensor processor (controller) 390. In this case, the EPD processor 331 and the touch sensor processor 390 may be integrated into the processor 330 and their functions may be performed by the processor 330.

The same function of the communication interface 340 as that of FIG. 13 is not described again for the sake of brevity.

The user interface 350 is a device for receiving a user input or providing information to the user, and may include a plurality of buttons, a microphone, a speaker, a vibration motor, a connector, a keypad, a touch screen, and a camera.

The buttons may be formed on the front surface, side surface, or rear surface of the main board 320 or the portable display apparatus 300, and may include a power/lock button (not shown), a volume button (not shown), a menu button, a home button, a back button, a search button, etc.

The microphone may receive a voice or a sound and generate electric signals under the control of the processor 330.

The speaker may output sounds corresponding to various signals (for example, a radio signal, a broadcast signal, a digital audio signal, a digital video file, or photographing) to the outside of the portable display apparatus 300 under the control of the processor 330. The speaker may output a sound corresponding to a function which is performed by the portable display apparatus 300. A single speaker and a plurality of speakers may be formed on an appropriate location or locations of the main board 320 or the portable display apparatus 300.

The vibration motor may convert an electric signal into a mechanical vibration under the control of the processor 330. For example, in response to the portable display apparatus 300 in a vibration mode receiving a voice call from another device (not shown), the vibration motor may be driven. A single vibration motor or a plurality of vibration motors may be formed in the main board 320 or the portable display apparatus 300. The vibration motor may provide a haptic service in response to a user's touch operation on the image sheet 310 and a continuous movement of a touch on the image sheet 120.

A connector may be used as an interface for connecting the portable display apparatus 300 and an external device (specifically, the docking unit 200) or a power source (not shown). The connector may include a plurality of terminals. The portable display apparatus 300 may transmit data stored in the memory 360 of the portable display apparatus 300 to an external device or may receive data from an external device through a wire cable connected to the connector under the control of the processor 330. Power may be inputted from a power source or a battery may be charged through the wire cable connected the connector.

The keypad may receive a key input to control the portable display apparatus 300 from the user. The keypad may include a physical keypad which is formed on the main board 320 or the portable display apparatus 300 or a virtual keypad which is displayed on the image sheet 310.

The touch screen may provide user interfaces corresponding to various services (for example, calling, transmitting data, broadcasting, photographing) to the user. The touch screen may transmit an analogue signal corresponding to at least one touch inputted to the user interface to the processor 330. The touch screen may receive an input of at least one touch through a user's body (for example, user's fingers including user's thumb) or an inputting means for touching (for example, a stylus pen). In addition, the touch screen may receive an input of a continuous movement of one of the at least one touch. The touch screen may transmit an analogue signal corresponding to the continuous movement of the inputted touch to the processor 330.

The touch recited in the disclosure is not limited to contact of the user's body or inputting means for touching with the touch screen or the image sheet 120, and may include a contactless operation. The touch screen may be implemented in a resistive method, a capacitive method, an infrared method, or an acoustic wave method, for example.

The sensor 370 may include at least one sensor for detecting a state of the portable display apparatus 300. For example, the sensor 370 may include a proximity sensor to detect whether the user approaches the portable display apparatus 300 or not, or a motion/orientation sensor or a camera module to detect an operation of the portable display apparatus 300 (for example, rotation, acceleration, deceleration, vibration, etc. of the portable display apparatus 300). In addition, the motion/orientation sensor may include at least one of an acceleration sensor, a gravity sensor, a geomagnetic sensor, a gyro sensor, a shock sensor, a GPS, and a compass sensor.

The sensor 370 may detect the state of the portable display apparatus 300, and generate a signal corresponding to the detection and transmit the signal to the processor 330. For example, a GPS module may receive radio waves from a plurality of GPS satellites (not shown) existing in Earth's orbit, and calculate the location of the portable display apparatus 300 using time of arrival from the GPS satellite (not shown) to the portable display apparatus 300. The compass sensor may calculate a posture or orientation of the portable display apparatus 300.

The sensor 370 may include a camera to photograph a still image or a moving image under the control of the processor 330.

The camera may include a lens system, an image sensor, a flash, or etc. The camera may convert an optical signal which is inputted (or photographed) through the lens system into an electric image signal, and output the electric image signal to the processor 330, and the user may photograph a moving image or a still image through such a camera.

The lens system forms an image of a subject by converging light entering from the outside. The lens system may include at least one lens and the lens may be a convex lens or an aspheric lens. The lens system has symmetry with respect to an optical axis passing through the center thereof, and the optical axis is defined as a center axis. The image sensor may detect an optical image which is formed by external light entering through the lens system as an electric image signal. The image sensor may include a plurality of pixel units which are arranged in the M×N matrix pattern, and the pixel unit may include a photodiode and a plurality of transistors. The pixel unit accumulates electric charges which are generated by incident light, and a voltage generated by the accumulated electric charges indicates illuminance of the incident light. In processing an image forming a still image or a moving image, the image signal outputted from the image sensor may be formed of a set of voltages (that is, pixel values) outputted from the pixel units, and the image signal may indicate a single frame (that is, a still image). In addition, the frame may be formed of M×N pixels. The image sensor may include a Charge Coupled Device (CCD) image sensor, a Complementary metal-oxide semiconductor (CMOS) image sensor, etc.

The image sensor may operate all of the pixels of the image sensor or only pixels of a region of interest from among all of the pixels according to a control signal received from the processor 330. The image data outputted from the pixels may be outputted to the processor 330.

In addition, the sensor 370 may detect an arrangement relationship with other portable display apparatuses. Specifically, the sensor 370 may detect whether other portable display apparatuses are arranged on the left/right or the upper/lower side using hall sensors or magnets disposed on a plurality of locations. In addition, the sensor 370 may detect whether the plurality of portable display apparatus overlap one another or not, and, if so, detect whether the corresponding portable display apparatus is located on the top or bottom.

The processor 330 may process an image which is inputted from the camera or an image which is stored in the memory 360 on a frame basis, and output the image frame which is converted to be suitable to the screen characteristics (size, image quality, resolution, etc.) of the image sheet 120 to the image sheet 120 or may store the image frame in the memory 360.

The processor 330 may control the overall operations of the portable display apparatus 300 and control other elements of the portable display apparatus 300 to perform an image transferring job. Hereinafter, the term "processor" indicates the processor 330, but the processor 330 may be referred to as a main processor to be distinguished from the other processors. The processor 330 may include a single core, dual core, triple core, or quad core processor. The processor 330 may receive broadcast signals (for example, a TV broadcast signal, a radio broadcast signal, or a data broadcast signal) sent from a broadcasting station, and broadcast additional information (for example, Electric Program Guide (EPS) or Electric Service Guide (ESG)) through the communication interface 340. In addition, the processor 330 may reproduce a digital audio file (for example, a file having an extension of mp3, wma, ogg, or wav) stored in the memory 360 or received. In addition, the processor 330 may reproduce a digital video file (for example, a file having an extension of mpeg, mpg, mp4, avi, mov, or mkv) stored in the memory 360 or received. The processor 330 may transfer a content which is stored in the memory 360 or received to the image sheet 120 in the form of an image according to a user command, menu selection or event information which is inputted through the sensor 370, the user interface 350, the touch sensor 371, or the auxiliary sensor 372. In this case, the image may be a still image or a moving image.

The memory 360 may store signals or data under the control of the processor 360. The memory 360 may store a control program and applications for controlling the portable display apparatus 300 or the processor 330.

The term "memory" may include a Read Only Memory (ROM) in the processor 330, a Random Access Memory (RAM), a memory card (not shown) mounted in the portable display apparatus 300 (for example, an SD card, a memory stick), a non-volatile memory, a volatile memory, a Hard Disk Drive (HDD) or a Solid State Driver (SSD).

The power manager 380 may supply power to the portable display apparatus 300 under the control of the processor 330. The power manager 380 may be connected with a single battery or a plurality of batteries (not shown). In addition, the power manager 380 may supply the portable display apparatus 300 with power which is inputted from an external power source (not shown) through the wire cable connected with the connector.

The EPD processor 331 may output, to the first and second drivers 332 and 333, control signals for driving the image sheet 120 and the auxiliary sensor 372 under the control of the processor 330 and according to a predetermined EPD driving algorithm, and output interaction event information inputted from the auxiliary sensor 372 to the processor 330. The processor 330 may control the EPD processor 331 to adjust or update a content displayed on the portable display apparatus 300 according to the interaction event information.

When the predetermined EPD driving algorithm is designed to consider an ambient environment, the EPD processor 331 receives sensing data related to the ambient environment measured by the sensor 370. The sensor 370 may include a temperature sensor, an illuminance sensor, a humidity sensor, etc.

Hereinafter, a method for driving an image sheet 310 will be explained with reference to FIG. 15.

Figure 15:
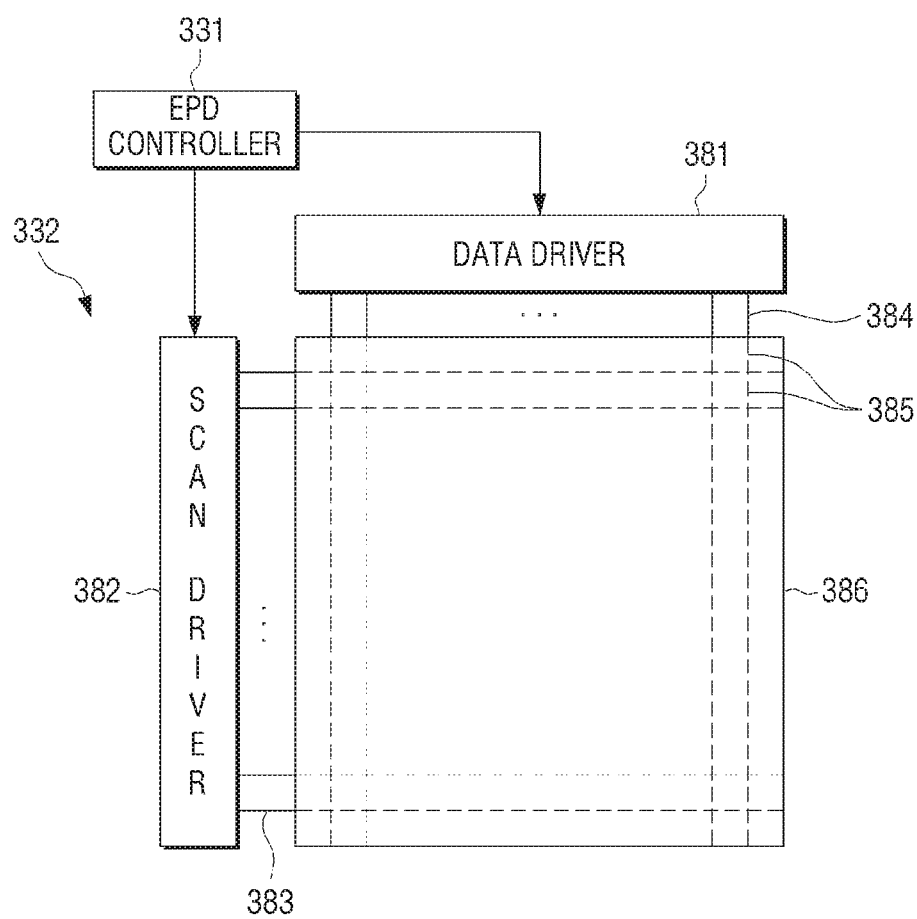
FIG. 15 is a view to illustrate a driving method of the display of FIG. 12.

FIG. 15 is a view to illustrate a method for driving an image sheet.

The first driver 332 generates address signals (that is, row signals) and data signals (that is, column signals) according to a control signal for displaying an image inputted from the EPD processor 331, and outputs the address signals and the data signals to the organic electronics backplane 386. The first driver 332 may include a scan driver 382 and a data driver 381.

The scan driver 382 may apply the address signals to scan lines 383 in sequence under the control of the EPD processor 331, and the data driver 381 may apply the data signals to data lines 384 under the control of the EPD processor 331.

The organic electronics backplane 386 may include a plurality of pixels 385, and each of the pixels 385 may include a pixel electrode 312 and a thin film transistor (TFT) 313.

The pixel electrode 312 may be connected to a corresponding scan line 383 and a corresponding data line 384 through a corresponding TFT 313. The TFT 313 has a gate (G), a drain (D), and a source (S), and the gate may be connected with a corresponding scan line 383, the drain may be connected with a corresponding data line 384, and the source may be connected with a corresponding pixel electrode 312.

The TFT 313 functions as an on/off switch and is in the on state in response to signals being applied to all of the connected scan lines 383 and data lines 384, and a voltage is applied to the corresponding pixel electrode 312 in response to the TFT 313 being in the On state.

The ink layer 316 displays an image pattern through movement of particles according to the electric field applied between the common electrode layer 317 and the organic electronics backplane 315. The ink layer 316 has an image pattern according to the above-described image transferring job, and the image pattern may be maintained until the next image transferring job.

The image sheet 310 may provide user interfaces corresponding to various services (for example, calling, transmitting data, broadcasting, photographing) to the user. The touch sensor 371 may transmit an analogue signal corresponding to at least one touch inputted by the user to the processor 330.

The touch sensor 371 may receive an input of at least one touch through a user's body (for example, user's fingers including user's thumb) or an inputting means for touching (for example, a stylus pen). In addition, the touch sensor 371 may receive an input of a continuous movement of one of the at least one touch. The touch sensor 371 may transmit an analogue signal corresponding to the continuous movement of the input touch to the processor 330.

The touch sensor processor 390 may output a control signal for driving the touch sensor 371 under the control of the processor 330 and a predetermined touch sensor driving algorithm to the touch sensor 371, and output user input information inputted to the touch sensor 371 using the user inputting means such as a pen 10 to the processor 330.

The processor 330 may control the EPD processor 331 to adjust or update a content displayed on the portable display apparatus 300 according to the user input information. In this example, the touch sensor 371 may be a touch sensor of an Electromagnetic Resonance (EMR) method.

Figure 16A:
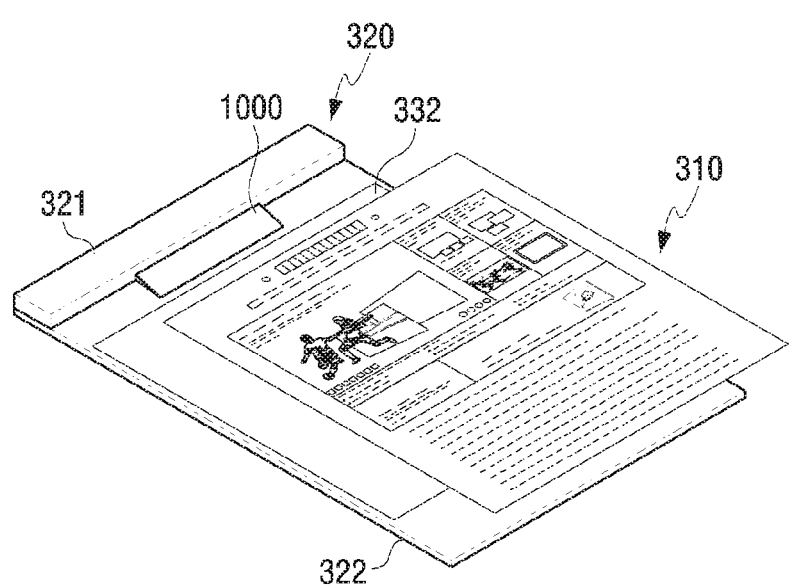
FIG. 16A is a view showing the portable display apparatus and the display which are separated from each other.
Figure 16B:
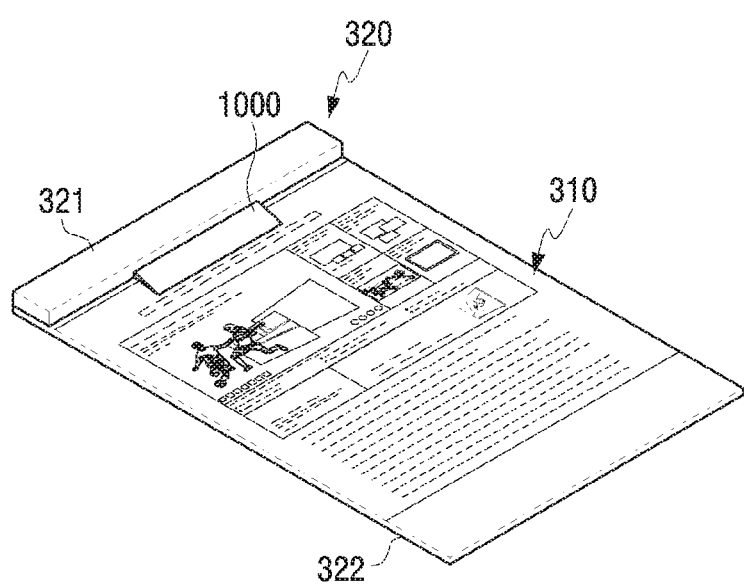
FIG. 16B is a view showing the portable display apparatus and the display which are connected with each other.

FIG. 16A is a view showing the portable display apparatus and the EPD panel which are separated from each other according to an exemplary embodiment. FIG. 16B is a view showing the portable display apparatus and the EPD panel which are connected with each other.

Referring to FIGS. 16A and 16B, the portable display apparatus 300 may include a substrate, a main board 320 mounted on the substrate, a clip 1000 for fixing the EPD panel 310, and a touch sensor 371 for detecting a user input. A bottom board 322 may be provided to accommodate the EPD panel 310, and a body 321 may be provided to abut the EPD panel 310 on one side.

Figure 17:
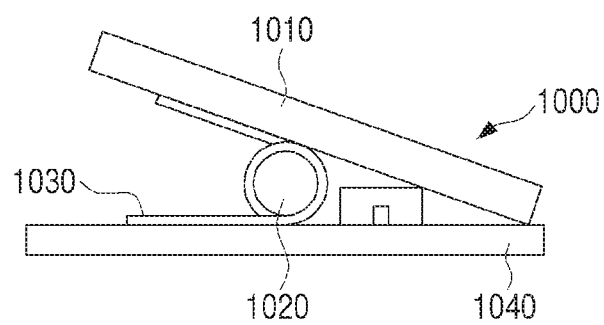
FIG. 17 is a side view showing the clip of FIG. 16.

FIG. 17 is a side view showing the clip of FIGS. 16A and 16B.

Referring to FIG. 17, an interface for communicating with the EPD panel 310 may be disposed on the top surface of the substrate hidden by the clip 1000.

In addition, the clip 1000 may include a pressing plate 1010 which is pressed by the user with user's hand, an elastic member 1030 like a spring, and a support member 1020 in which the elastic member 1030 is caught.

In response to the user pressing one end of the pressing plate 1010, the other end of the pressing plate 1010 is lifted up and the EPD panel 310 is inserted into a space between the other end and the substrate 1040, and then, in response to the user releasing the applied force, the other end of the pressing plate 1010 descends to the original position by the recovering force of the elastic member 1030 and presses the portable EPD panel 310 and fixes the same.

In the example of FIGS. 16A and 16B and FIG. 17, the EPD panel may be separated from the portable display apparatus 300. However, in practice, the EPD panel may be fixed to the portable display apparatus 300.

Figure 18:
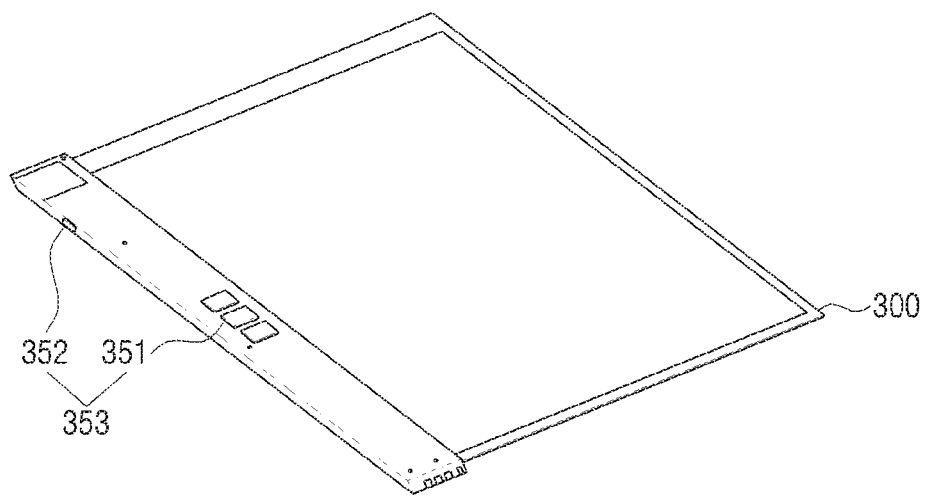
FIG. 18 is a view showing a plurality of buttons which are arranged on one side of the portable display apparatus.

FIG. 18 is a view showing a plurality of buttons which are arranged on one side of the portable display apparatus.

Referring to FIG. 18, a plurality of buttons 353 may be arranged on the main board 320. Herein, the plurality of buttons may include a power button 352 arranged on the side surface of the main board 320 and a manipulation button 351 arranged on the top surface of the main board 320.

The power button is a button for receiving selection of an operation state of the portable display apparatus 300 from the user, and may stop a display operation of the display 310 or a power off operation of a system according to user's manipulation.

The manipulation button is a button for converting a content or receiving a scrap command, and may include three buttons in the illustrated example. In practice, four or more buttons may be implemented. The manipulation button may be used to convert a display state of a content, scrap a content, or select WiFi or other terminal devices.

Figure 19:
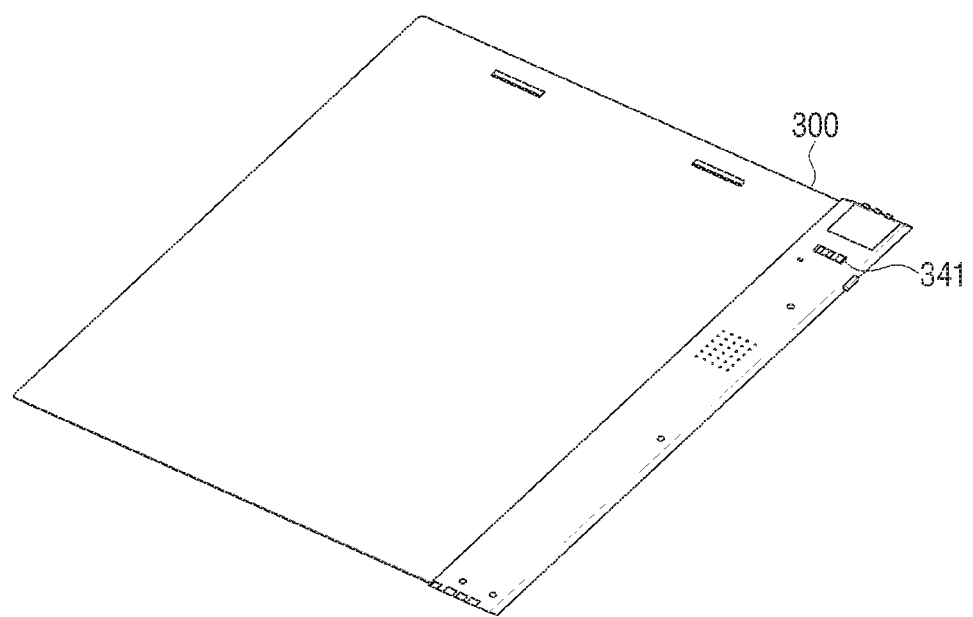
FIG. 19 is a view showing a plurality of pins which are arranged on the rear surface of the portable display apparatus.
Figure 20:
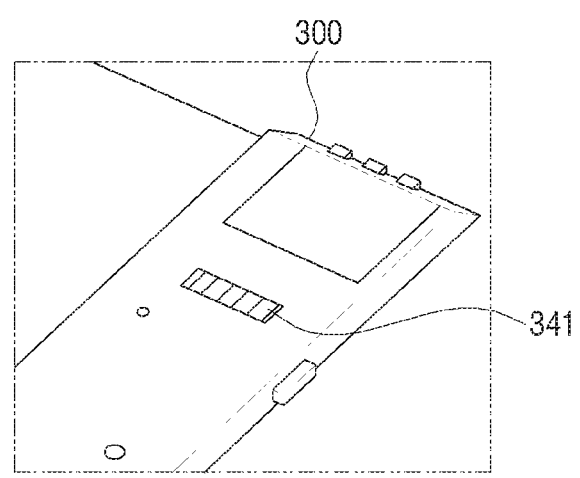
FIG. 20 is a view showing detailed forms of the plurality of pins of FIG. 19.
Figure 21:
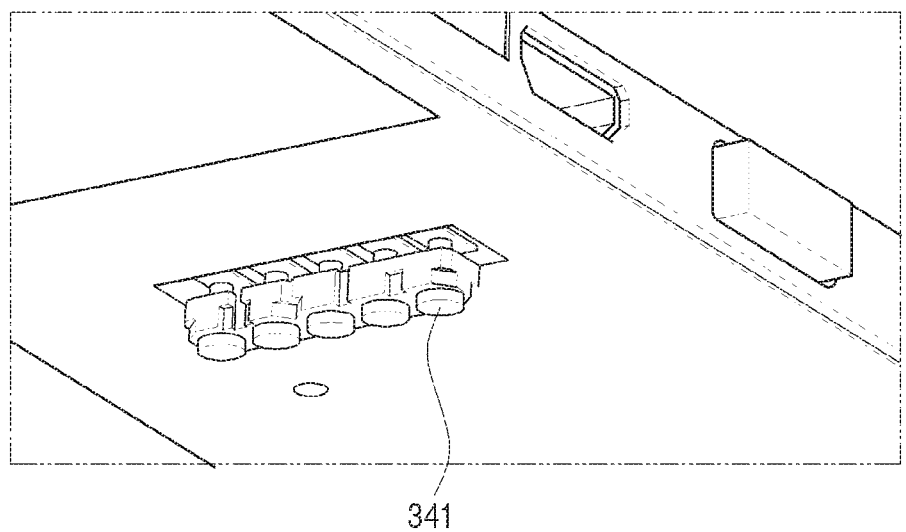
FIG. 21 is a view showing pogo pins of the docking unit which are arranged on locations corresponding to the plurality of pins of FIG. 19.

FIG. 19 is a view illustrating a plurality of pins 341 which are arranged on the rear surface of the portable display apparatus. FIGS. 20 and 21 are views showing detailed shapes of the plurality of pins 341 of FIG. 19.

Referring to FIGS. 19 to 21, a plurality of terminals for connecting to the docking unit 200 in a wired manner may be arranged on the lower end of the portable display apparatus. Herein, the plurality of terminals may be configured to receive serial communication and power. For example, five terminals may be provided.

In addition, the plurality of terminals may be arranged to connect with the docking unit in a slide pattern when being inserted into the slots of the docking unit. The docking unit 200 may include connection terminals formed on locations corresponding to the plurality of terminals of the portable display apparatus 300 to be electrically connected with the plurality of terminals. Since the connection terminals are continuously exposed, the connection terminals may be formed to be durable and to be able to connect well regardless of dust or contamination. To achieve this, a pogo pin (or a spring pin) may be used as shown in FIG. 21. Herein, a pin to be pressed by a specific terminal may be used.

Hereinafter, various using scenarios will be explained based on a user interface window displayed on the portable display apparatus.

It is common that a user prints a document which is being created in a PC using an image forming apparatus to fully review the document or submit or share the document.

User's behaviors of printing a document, laying the document on a desk, and viewing the document, or holding the document in a user's hand and viewing the document stem from lightness of paper, cheap price, and the feature that paper is a writable medium. This is because printing and viewing the document are more convenient than viewing the document through a monitor.

However, when the user finds an error in the document after outputting paper, the user should correct the error in the PC and output again, which may cause inconvenience. In this case, the user should convert contents written on the paper document into contents in an electronic form in the PC.

In converting a format from paper to digital media, many efforts and costs are required. Since the paper is cheap and very intuitive, the paper is suitable to works which need to be read and written directly. The digital media are difficult for the user to be accustomed to using, but are easy to search and share. The media have different merits and a medium integrating their usability is a current image forming apparatus.

However, the image forming apparatus has a large size and should be connected with a PC, and is a simplified device using paper as an inputting or outputting means. Since the image forming apparatus has difficulty in responding to direct information activity in real time, there are interruptions in processing works.

This is because a content that the user just writes cannot be digitized at the same time, and a series of processes of moving to the image forming apparatus provided with a scanner, scanning, and then transmitting the scanned content to the PC through a network act as a factor to hinder the continuity of works. In the process of mixing paper and digital media, how the conversion process between two media may be performed smoothly and rapidly is crucial.

In the related-art methods, when an ultra-slim display apparatus is not used as a single device like a tablet and a plurality of display apparatuses are used like paper, there may be inconvenience. This is because the display apparatuses should be paired in many times for the purpose of mutual communication and should be directly controlled. In addition, the operation of downloading or deleting a content should be performed in every independent apparatus, which may cause inconvenience. In addition, when there is a document that the user has viewed, the document should be directly deleted and a content which has not been downloaded should be downloaded and viewed by the user.

Accordingly, the exemplary embodiments introduce an apparatus and method for automatically connecting devices and automatically downloading contents in order to enhance mutual interworking convenience of the portable display apparatuses.

Optimally, the exemplary embodiments aim at providing the continuity of works between a paper document and an electronic document while reducing repetitive works such as paper output of electronic documents, correction and review of paper documents, and scanning. An apparatus having an ultra-slim display mounted therein is used to substitute for paper, and the discontinuity of works which may be caused when the format of the medium is changed may be solved and conversion may be performed smoothly and efficiently by supporting various operation scenarios.

A related-art method displays a plurality of pages and reduces/magnifies the pages using a single display apparatus. However, the disclosure utilizes a plurality of portable display apparatuses, and thus may support user's habits of opening out and viewing documents or stacking and viewing documents like paper.

The demerit (downside) of paper that the paper should be manually dealt with may be solved by digital technology, and information may be processed efficiently. The disclosure may achieve an effect of enhancing a media conversion process and an information processing process efficiently in an office environment where both paper and digital media are utilized.

First, a process of transmitting data to the portable display apparatus will be explained hereinafter with reference to FIGS. 22 to 25. It is assumed that the plurality of portable display apparatuses are mounted in the docking unit 200 of the image forming apparatus 100 in advance.

Figure 22:
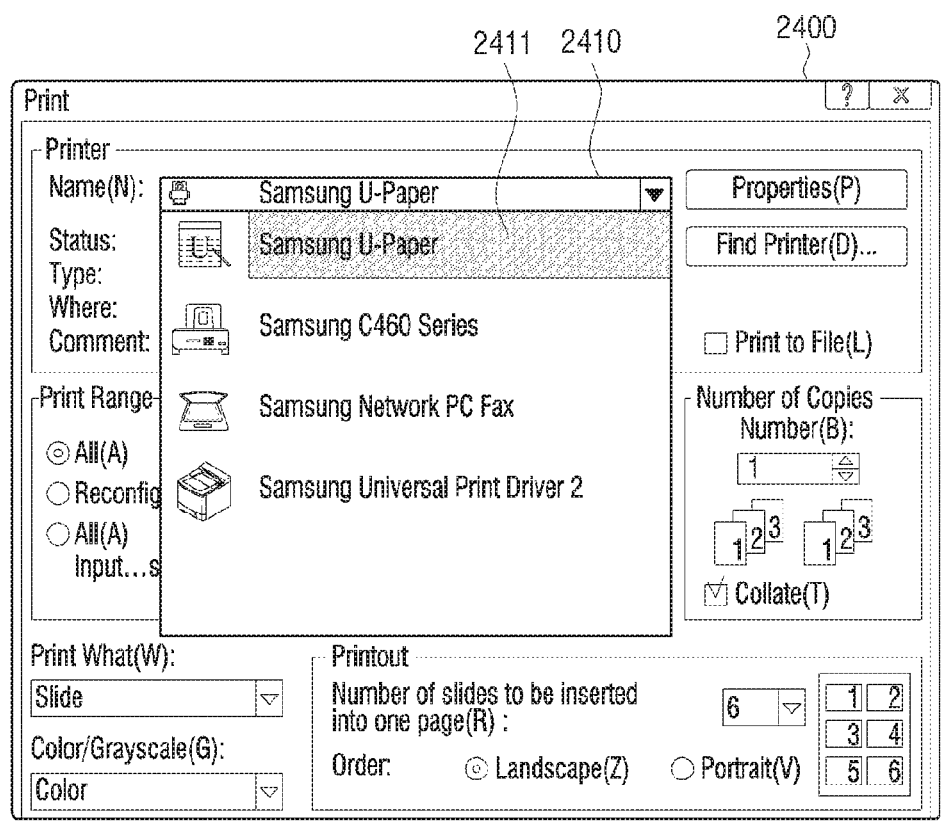
FIGS. 22 to 25 are views showing various examples of a user interface window which is displayable on a host device.

In response to the user selecting a print button on a document to be transmitted to the portable display apparatus, a user interface window may be displayed as shown in FIG. 22.

FIG. 22 is a view showing an example of a user interface window which is displayed in response to a print command being inputted on a document.

Referring to FIG. 22, the user interface window 2400 may include an area 2410 to select a printer to perform a printing job, and a plurality of areas to receive selection of a print option to be applied to the selected printer.

In response to the image forming apparatus 100 including the docking unit 200 being connected to the host device 400, other normal printer drivers and a virtual printer driver according to an exemplary embodiment are displayed on the area 2410 for selecting the printer. Herein, the virtual printer driver is a printer driver which performs a function of transmitting a document to the portable display apparatus mounted in the docking unit 200.

In response to the user selecting a normal printer driver in the area 2410 for selecting the printer, a normal printing job is performed. On the other hand, in response to the user selecting a corresponding virtual printer driver (U-paper) (or a VPD driver) 2411, a user interface window as shown in FIG. 23 may be displayed.

Figure 23:
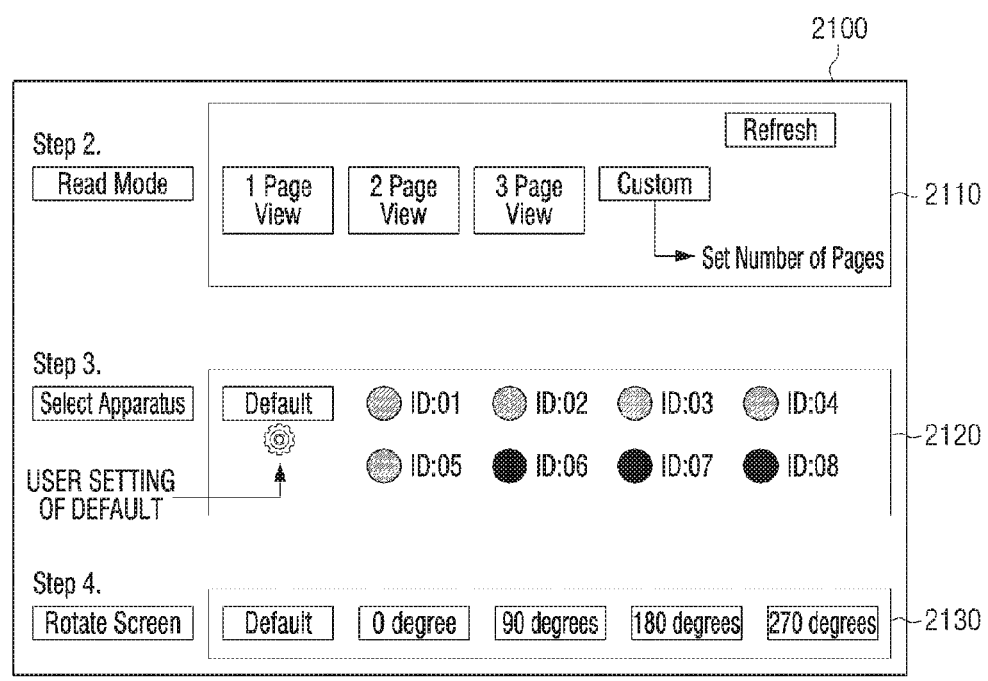

FIG. 23 is a view showing an example of a user interface window which is displayed in response to the virtual printer driver being selected.

Referring to FIG. 23, the user interface window 2100 may include a read mode area 2110, a device selection area 2120, and a layout area 2130.

The read mode area 2110 is to implement a user scenario for utilizing the plurality of portable display apparatuses. For example, a 2 page view mode is to provide an experience of viewing two surfaces simultaneously like a real book. In the 2 page view mode, information on odd and even pages may be transmitted to the two portable display apparatuses, and, in response to a page being turned over in one display apparatus (the page may be turned over through a touch sensor, an acceleration sensor, a proximity sensor, and a switch), the page of the other display apparatus is automatically turned over.

In order to achieve the effect of turning over pages using interworking images of the two portable display apparatuses, the communication interfaces of the portable display apparatuses should be connected with each other to be able to perform data communication, and, in response to the read mode being selected, the VDP driver automatically sets an environment in which data communication may be performed between the display apparatuses.

For example, the portable display apparatuses which are selected through the device selection area may be grouped to a group, and device ID information in the group may be transmitted to the portable display apparatuses in the group. The portable display apparatus which receives the device ID may perform pairing using the device IDs of the other display apparatuses.

The device selection area 2120 is an area for receiving selection of the ID of the portable display apparatus connected to the docking unit 200. First, in response to the user selecting the VPD, it is automatically checked that the display apparatus is connected to the docking unit 200 through a USB, and the device selection area 2120 displays only the connectable portable display apparatus in the activated state.

Herein, the 'Default' icon is to have the portable display apparatus automatically selected as pre-set by the user, and, in response to a setting icon placed under the Default icon being clicked, a data overwriting option may be selected. Herein, options "size of stored data" and "final data storing time" may be designated, and one of the two options which is selected may be designated as 'Default' of the device selection.

Figure 24:
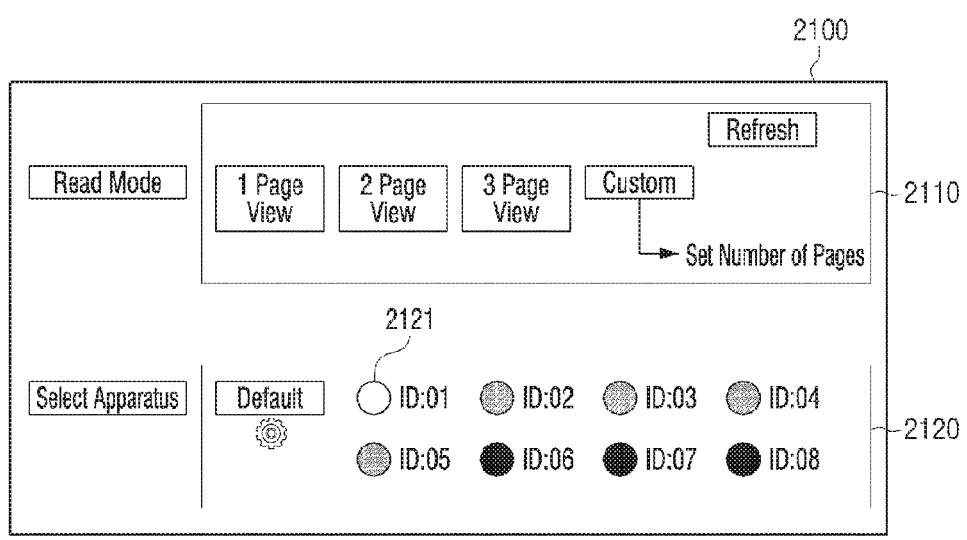
Figure 25:
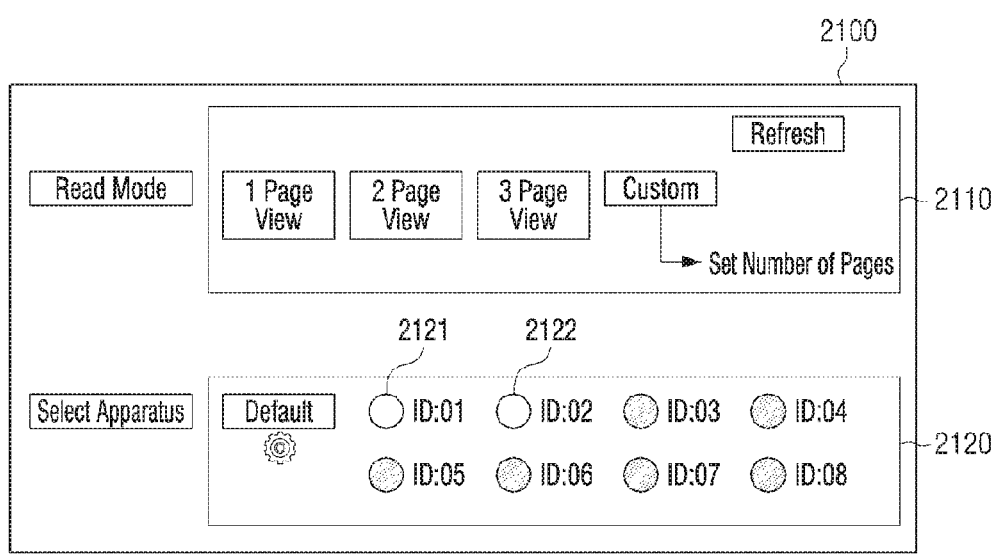

In response to display apparatuses being determined to be directly selected without selecting the 'Default' option and the '2 page view' mode being selected, apparatus 1 2121 and apparatus 2 2122 may be selected in order as shown in FIGS. 24 and 25. Specifically, in response to 'ID:01' being selected in the device selection area as shown in FIG. 24, selection of the 'ID:01' button is displayed.

In addition, since the '2 page view' mode is selected, one more apparatus should be selected. In response to 'ID:02' being selected as shown in FIG. 25, the color of the selected button may be changed and simultaneously the buttons of the other apparatuses may be inactivated so that they cannot be selected.

When the user selects apparatuses but wants to change the selected apparatuses, the selection of the apparatus may be canceled by selecting the button of the already selected apparatus, and the buttons of the other apparatuses which were not selected before and were inactivated may be activated to be selected.

The layout area 2130 is an area for receiving selection of an output orientation of a document. Herein, the 'Default' is to convert the document with reference to the width and height length information of the document to be converted. For example, in response to the document being long in the vertical direction, the document may be converted to be consistent with the lengthwise side of the display apparatus. In response to the document being long in the horizontal direction, the document may be rotated in the clockwise direction by 90°.

In response to the user selecting '0°,' '90°,' '180°,' and '270°,' an image may be rotated in the clockwise direction as designated by the user regardless of the width and height length of the document. In response to the user selecting '0°,' '90°,' '180°,' and '270°,' the layout of an output image may be displayed in a preview form.

In response to the print button being pressed after the above-described process, the host device may convert document data into an image (PNG, JPG, GIF, BMP) and transmit the image to the image forming apparatus.

Accordingly, the user may easily transmit the document to the plurality of portable display apparatuses as desired by simply selecting the read mode, the apparatuses, and the layout displayed on the UI, and finish setting interworking between the plurality of portable display apparatuses.

Figure 26:
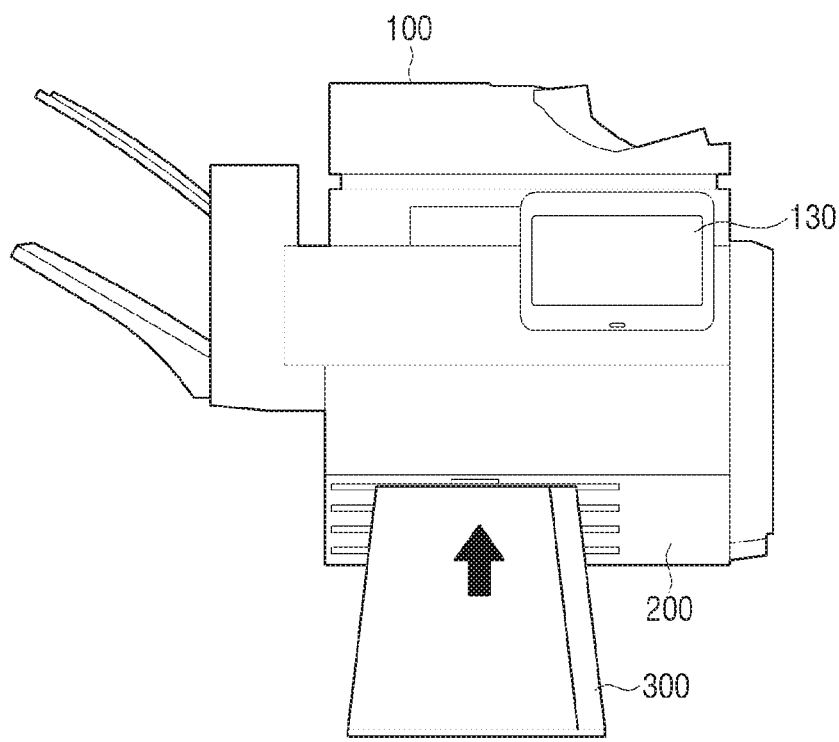
FIG. 26 is a view to illustrate a method for mounting the portable display apparatus in the docking part.

FIG. 26 is a view to illustrate a method for mounting the portable display apparatus in the docking unit.

Referring to FIG. 26, the portable display apparatus may be mounted in one of the plurality of slots formed in the docking unit 200 in the sliding method. In response to the portable display apparatus being connected to the docking unit 200 in this way, the image forming apparatus 100 may automatically analyze data stored in the portable display apparatus, and determine whether there exists data generated in the portable display apparatus, scrapped data, or data updated reflecting a user input, and, in response to such data existing, automatically back the data up.

In addition, in response to the portable display apparatus being connected to the docking unit 200, the image forming apparatus 100 may display data stored in the portable display apparatus by activating an EPD print function and an EPD copy function of copying data scanned by the canner into the portable display apparatus.

Herein, the EPD print function is a function of the image forming apparatus of receiving data stored in the portable display apparatus and printing the received data. In addition, the EPD copy function is a function of, in response to a document being scanned with the portable display apparatus being mounted in the image forming apparatus, storing the scanned document in the portable display apparatus. Hereinbelow, a user interface window which is displayed on the image forming apparatus in response to the EPD copy function being selected will be explained.

Figure 27:
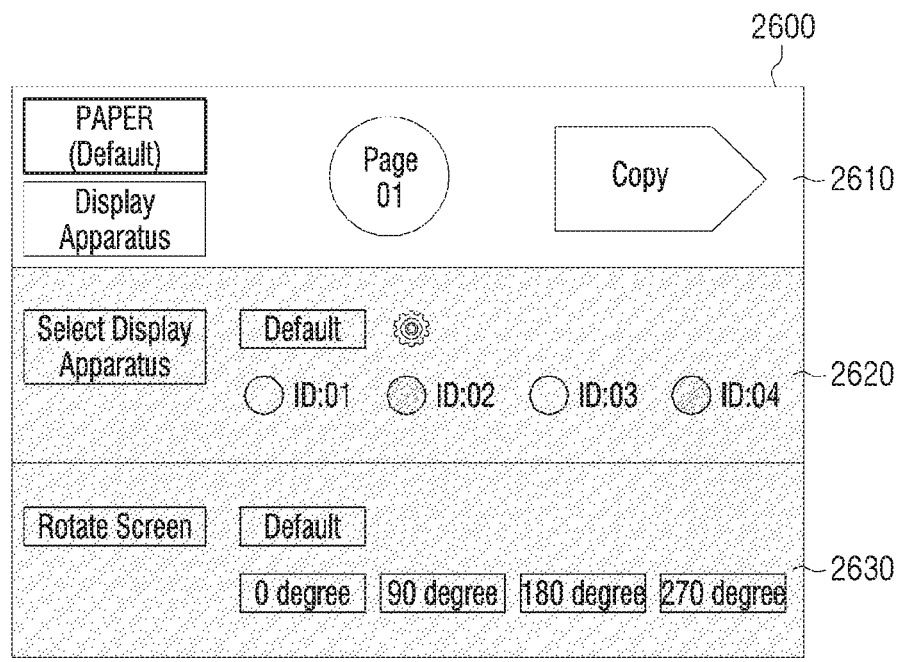
FIGS. 27 to 29 are views showing examples of the user interface window which is displayable on the image forming apparatus.
Figure 28:
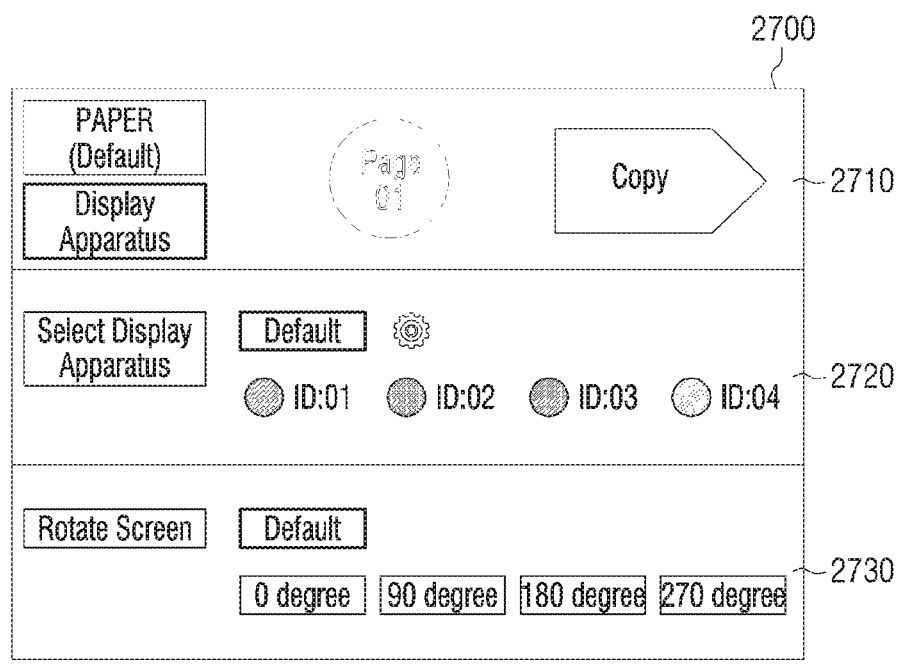
Figure 29:
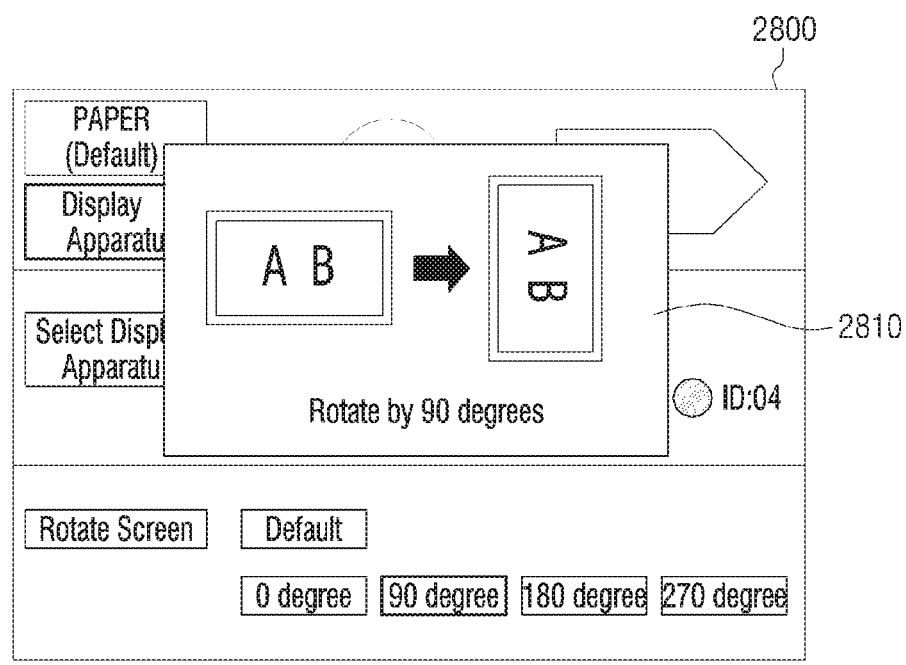

FIGS. 27 to 29 are views showing examples of a user interface window which is displayed in the image forming apparatus.

Referring to FIG. 27, the user interface window 2600 may include an area 2610 to receive selection of a copy mode, a device selection area 2620, and a layout area 2630.

The copy mode selection area 2610 is an area to receive selection of a normal printing operation which prints on paper or an EPD copy function which stores a scanned document in the portable display apparatus from the user. In response to the user not selecting the EPD copy function, the device selection area 2620 and the layout area 2630 are inactivated as shown in FIG. 27.

In response to the user selecting via the user interface window 2700 the EPD copy function in the copy mode selection area 2710, the device selection area 2720 and the layout area 2730 are activated as shown in FIG. 28.

The device selection area 2620 is an area for receiving selection of the ID of the portable display apparatus 300 connected to the docking unit 200. First, in response to the user selecting the VPD, the portable display apparatus which is connectable through a USB may be identified, and the device section area 2620 may display the connectable portable display apparatuses by activating only the areas corresponding to the connectable portable display apparatuses.

The layout area 2630 is an area for receiving selection of an output orientation of a document. In response to the user selecting via the user interface window 2800 '0°,' '90°,' '180°,' and '270°,' the layout of an output image may be displayed in a preview form 2810 as shown in FIG. 29.

Figure 30:
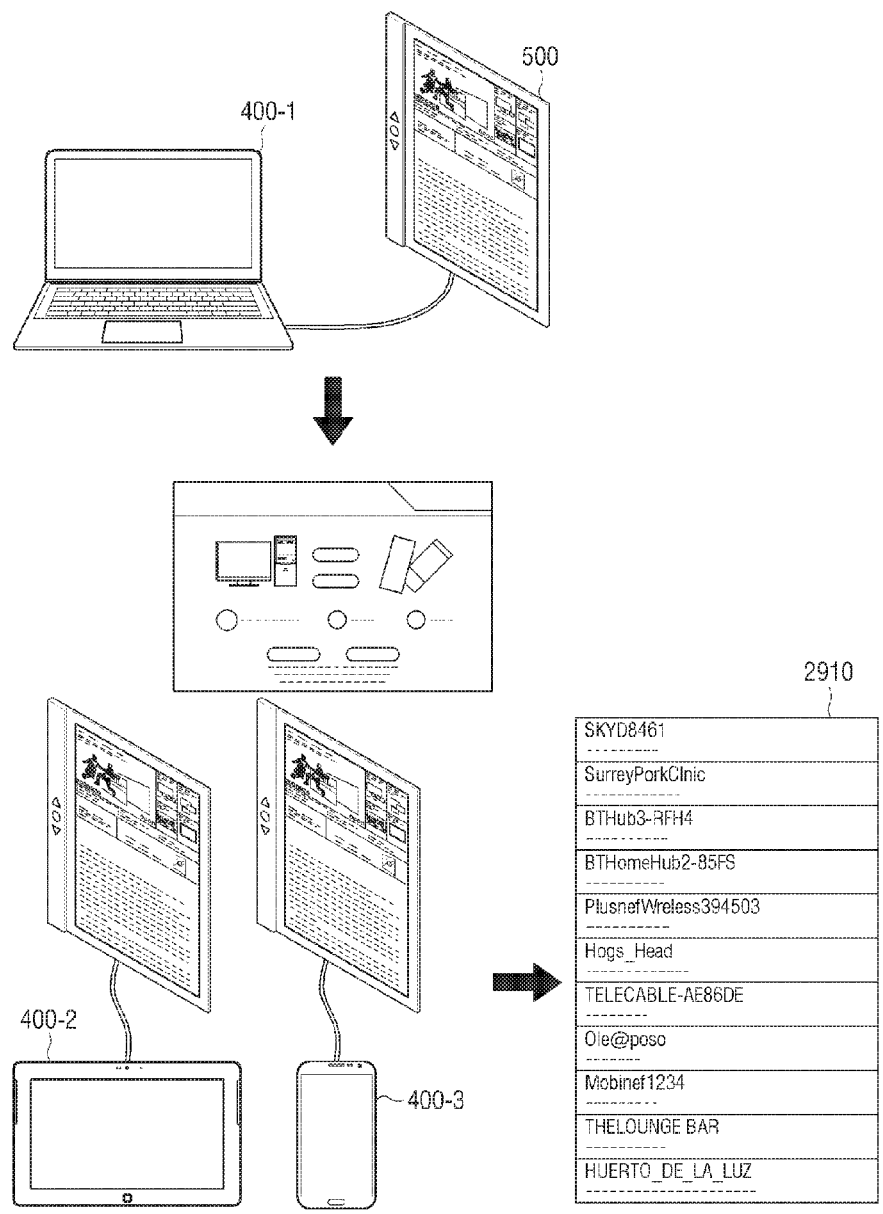
FIG. 30 is a view to illustrate interworking between the plurality of portable display apparatuses.

FIG. 30 is a view to illustrate interworking between the plurality of portable display apparatuses.

Referring to FIG. 30, the portable display apparatus 500 may be independently operated or may be operated by interworking with the host device 400-1 such as a PC. Specifically, according to an exemplary embodiment, in response to the portable display apparatus 500 being connected to the host device such as a PC in a wire manner, the PC may operate the portable display apparatus 500 as a movable storage device.

Since the portable display apparatus may be provided with only a simple button, it is not easy to set WiFi, etc. in the portable display apparatus. In addition, in response to a single user using a plurality of portable display apparatuses, there is a need to individually set wireless connection of the plurality of portable display apparatuses, which may cause inconvenience. Accordingly, in an exemplary embodiment, it is more efficient to set an environment when all of the portable display apparatuses are mounted. That is, in response to the plurality of portable display apparatuses being mounted in the docking unit 200, the docking unit 200 may share hardware information with the plurality of devices 400-2, 400-3 and facilitate connection between the devices.

FIGS. 31 to 43 are views showing various interactions in the portable display apparatus.

Figure 31:
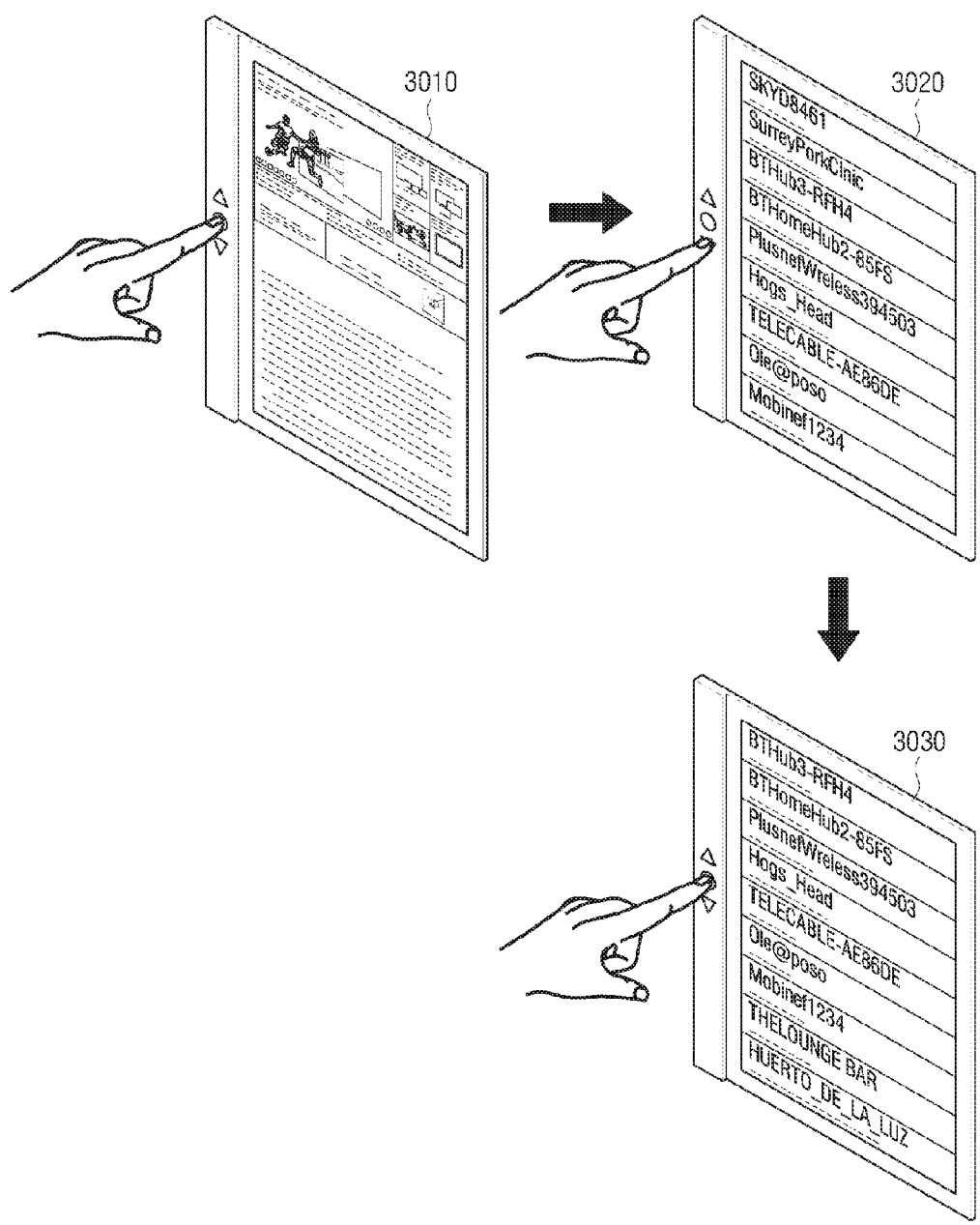
FIGS. 31 to 43 are views illustrating various interactions in the portable display apparatus.

FIG. 31 is a view to illustrate a process of setting WiFi information using a button provided in the portable display apparatus.

In a state in which a normal content screen 3010 is displayed, the user may press a selection key for more than a predetermined time to call a predetermined environment. In this case, a screen 3020 corresponding to the predetermined environment (for example, WiFi connection setting) may be displayed, and the user may select WiFi to be connected on the corresponding screen 3020 using a direction key.

After selecting WiFi to be connected, the user may set WiFi by pressing the selection key again as shown in screen 3030.

Figure 32:
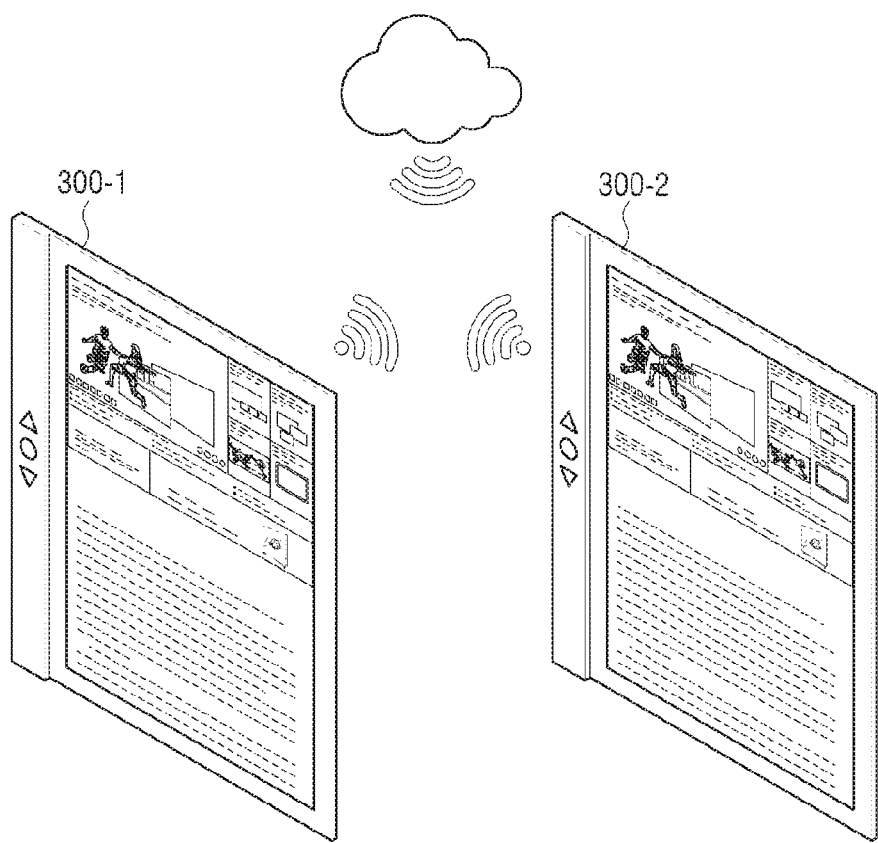

In response to the portable display apparatus which performs the above-described job interworking with another portable display apparatus, the setting in one apparatus 300-1 may be equally applied to another portable display apparatus 300-2 as shown in FIG. 32. That is, the user may adjust the settings of the plurality of portable display apparatuses by simply performing a single setting operation.

In the above-described example, the button provided in the display apparatus is used to set WiFi. However, the above-described button may be used to set a bookmark for an important page of a document. For example, in response to a middle selection button being pressed, a bookmark may be set for a currently displayed page, and, in response to the middle selection button being pressed again, the bookmark may be removed.

In response to the portable display apparatus in which a bookmark is set being mounted in the docking unit 200, the docking unit 200 may transmit a corresponding page for which the bookmark is set to a predetermined storage. The storage may be another portable display apparatus belonging to the same group, or may be a cloud server which is pre-registered by the user.

In response to a portable display apparatus which does not store data interworking, the bookmark in the portable display apparatus which stores data may be used for a function of transmitting the page for which the bookmark is set to the portable display apparatus which does not store data. This will be explained below with reference to FIG. 33.

Figure 33:
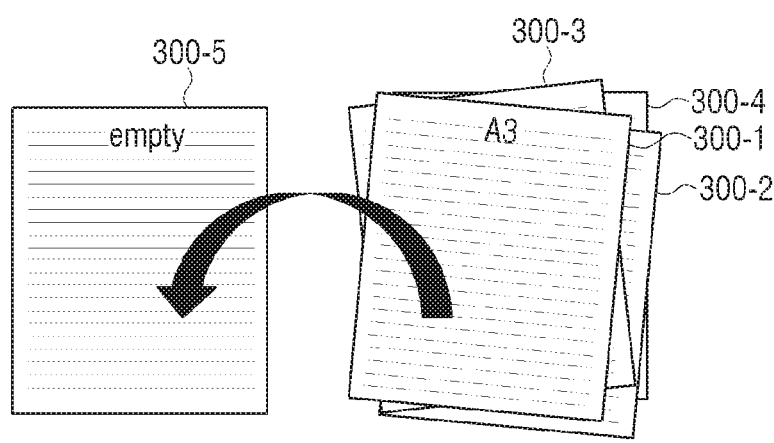

Referring to FIG. 33, five portable display apparatuses 300-1, 300-2, 300-3, 300-4, and 300-5 interwork with one another, and four portable display apparatuses 300-1, 300-2, 300-3, and 300-4 store different contents and one portable display apparatus 300-5 does not store contents.

In this case, in response to a bookmark being selected in one portable display apparatus 300-1, the corresponding portable display apparatus 300-1 may transmit a content corresponding to the bookmark to another portable display apparatus 300-5 for scrapping. Through this operation, the user may easily arrange only the data that the user needs from among the data stored in the plurality of portable display apparatuses 300-1, 300-2, 300-3, and 300-4 in one portable display apparatus 300-5.

Figure 34:
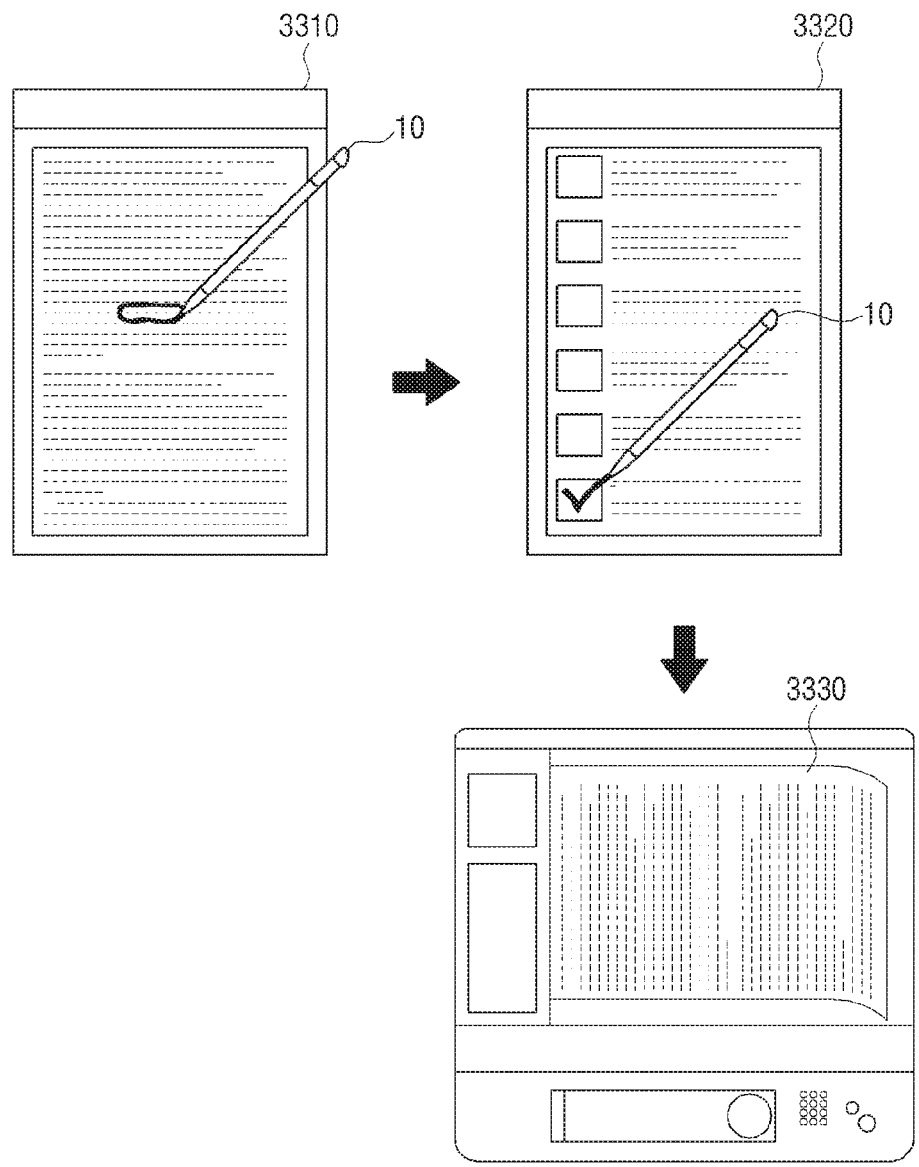

FIG. 34 is a view to illustrate a function of printing only the data which is selected by the user from among data stored in the portable display apparatus.

Referring to FIG. 34, the user may make a memo regarding an important portion using a stylus pen 10 while leafing through a document using the portable display apparatus (3310). In response to the user making a memo on a specific document, the corresponding memo may be stored as a separate file or may be stored in combination with the corresponding document.

The portable display apparatus may display a list regarding images stored therein, and the user may check only a portion necessary for a printing job on the displayed list (3320).

In response to the portable display apparatus being wirelessly connected with the image forming apparatus 100, the user may print only the checked printing data at the same time (3330).

As described above, since the user may select only the necessary data and perform a printing job for the data, the data may be systematically collected and resources may be saved.

Figure 35:
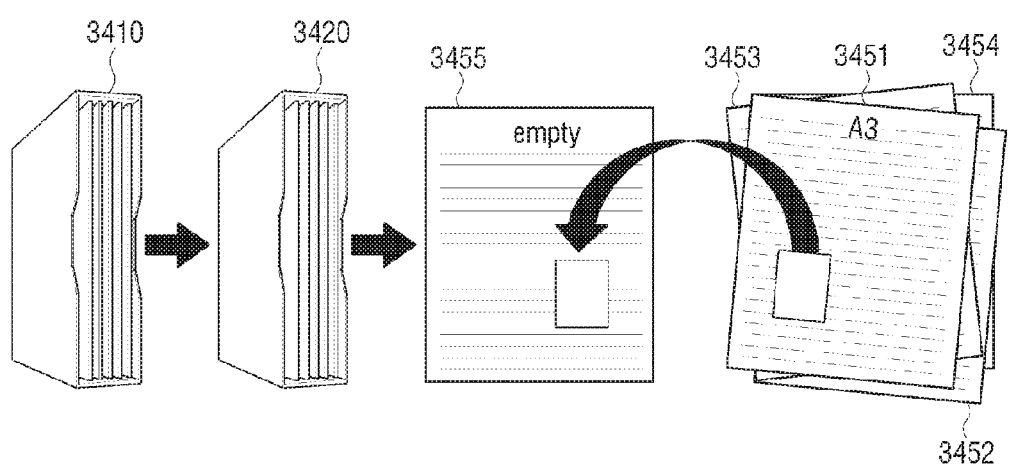

FIG. 35 is a view to illustrate an operation of arranging and scrapping data.

Referring to FIG. 35, a plurality of portable display apparatuses 3420 which do not store any data are mounted in the docking unit 200 (3410).

In this case, the user may transmit necessary data by selecting data to be transmitted and selecting a portable display apparatus to receive the corresponding data (3420). For example, in response to the user selecting specific law reports from 2001 to 2004, the law reports on the year basis may be stored in four portable display apparatuses 3451, 3452, 3453, and 3454. Specifically, the law reports of 2001 may be stored in the first portable display apparatus 3451, the law reports of 2002 may be stored in the second portable display apparatus 3452, the law reports of 2003 may be stored in the third portable display apparatus 3453, and the law reports of 2004 may be stored in the fourth portable display apparatus 3454.

The user may search a necessary precedent using the above-described four portable display apparatuses 3451, 3452, 3453, and 3454, and set a bookmark button on the necessary precedent, and the portable display apparatus in which the bookmark button is inputted may transmit the corresponding precedent to one portable display apparatus 3455 which does not store data. Accordingly, the user may easily scrap the necessary precedent from among the many precedents.

Figure 36:
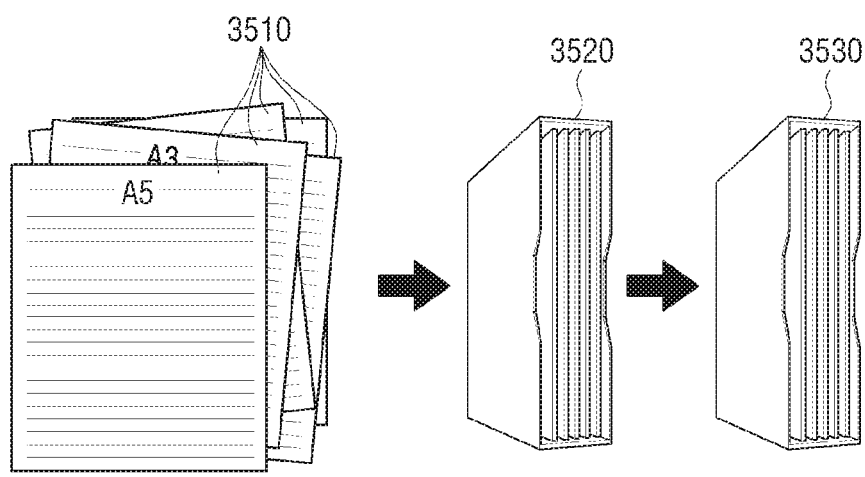

FIG. 36 is a view to illustrate an operation of physically rearranging data.

The plurality of portable display apparatuses may store various data. The plurality of portable display apparatuses may be inserted into the docking unit 200, and the docking unit 200 may assign file names having a common identifier to the data stored in the portable display apparatuses and arrange the order of the data 3510 according to the arrangement order of the docking unit.

For example, in response to the portable display apparatus which stores data of sequence number 2 being inserted into slot number 1, the portable display apparatus which stores data of sequence number 3 being inserted into slot number 2, and the portable display apparatus which stores data of sequence number 1 being inserted into slot number 3 (3520), the data of sequence number 2 may be deleted from the portable display apparatus of slot number 1, and the data of sequence number 1 may be stored therein. In addition, the data of sequence number 3 may be deleted from the portable display apparatus of slot number 2, and the data of sequence number 2 may be stored therein. In addition, the data of sequence number 1 may be deleted from the portable display apparatus of slot number 3, and the data of sequence number 3 may be stored therein (3530).

The above-described operation may be applied to an environment in which dozens of insurance planners work. Each of the insurance planners writes an application using the portable display apparatus, and, in response to the portable display apparatuses in which the applications are written being mounted in the docking device, the applications stored in the portable display apparatuses may be arranged according to a predetermined classifying criterion, may be automatically backed up in the management server, or may be rearranged and stored in the plurality of portable display apparatuses.

Figure 37:
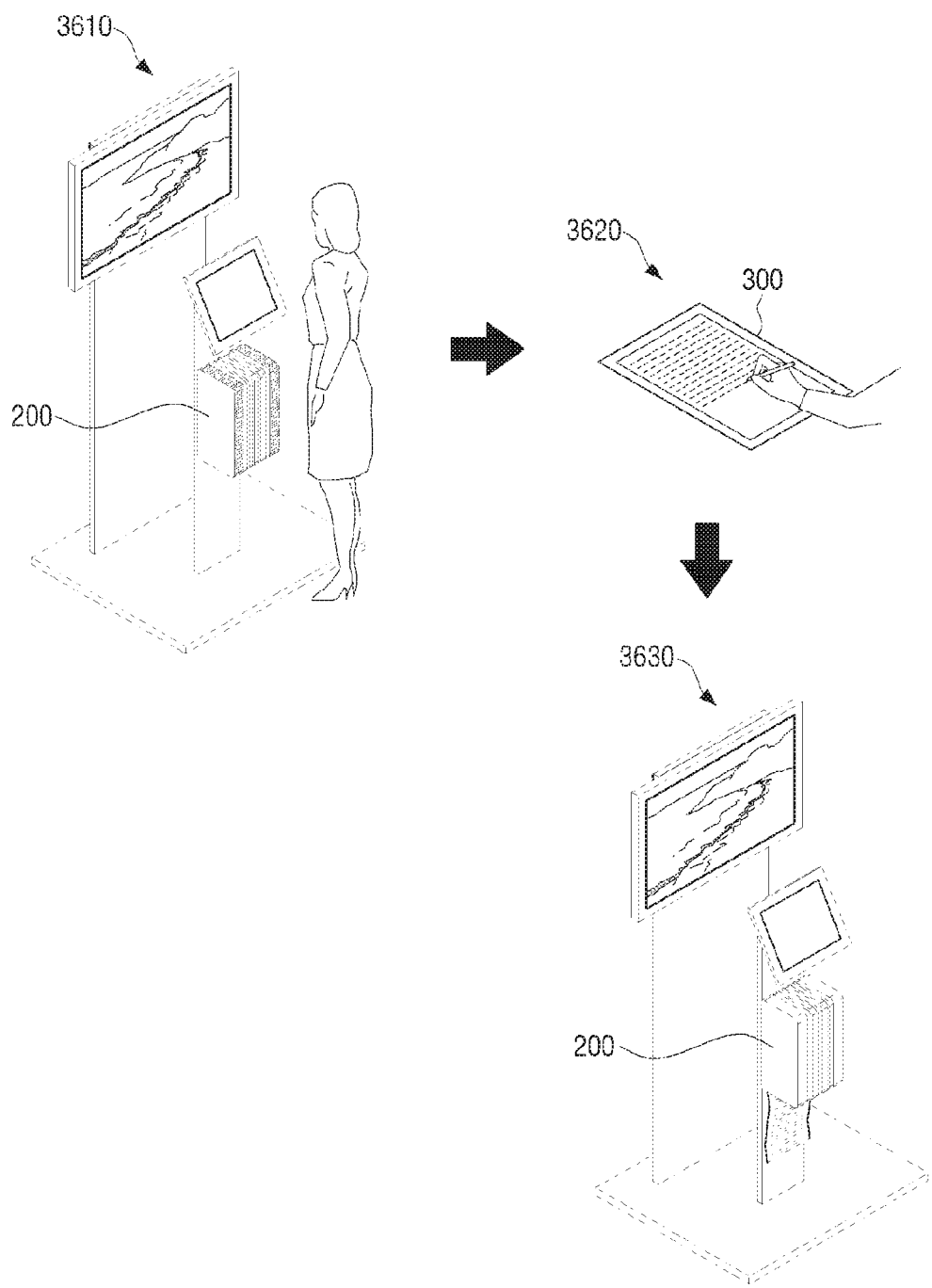

FIG. 37 is a view to illustrate a scenario for processing a work using a portable display apparatus in a public office.

Referring to FIG. 37, a visitor who wishes to apply for civil affairs receives a portable display apparatus necessary for applying for the civil affairs at a kiosk. Specifically, in response to the visitor inputting a type of civil affairs to be processed into the kiosk 200, the kiosk 200 may store a form corresponding to the corresponding type of civil affairs in the portable display apparatus and provide the form to the visitor (3610). Since the application form is provided to an individual as described above, private information is not exposed.

The visitor may additionally write necessary contents on the portable display apparatus (3620). In this case, the visitor may connect the visitor's portable terminal device (for example, a smart phone) to the portable display apparatus through NFC. In this case, user information stored in the portable terminal device may be transmitted to the portable display apparatus 300 and the form may be automatically filled.

In response to the user writing the user's signature in this state, the portable display apparatus may create civil affairs data by combining an existing civil affairs form and the information received from the user. As described above, since the user writes the application form using the electronic device, even when there is an error in writing a document, the user may easily correct the error.

In response to the user bringing the portable display apparatus to the kiosk, the created civil affairs data may be transmitted to the kiosk. The kiosk processes a work requested by the user using the transmitted data, and deletes the data stored in the mounted portable display apparatus, thereby preventing user's private information from being exposed.

In this case, the civil affairs may be applied for in a paperless manner. In addition, since necessary contents may be easily written, user convenience may be enhanced.

Figure 38:
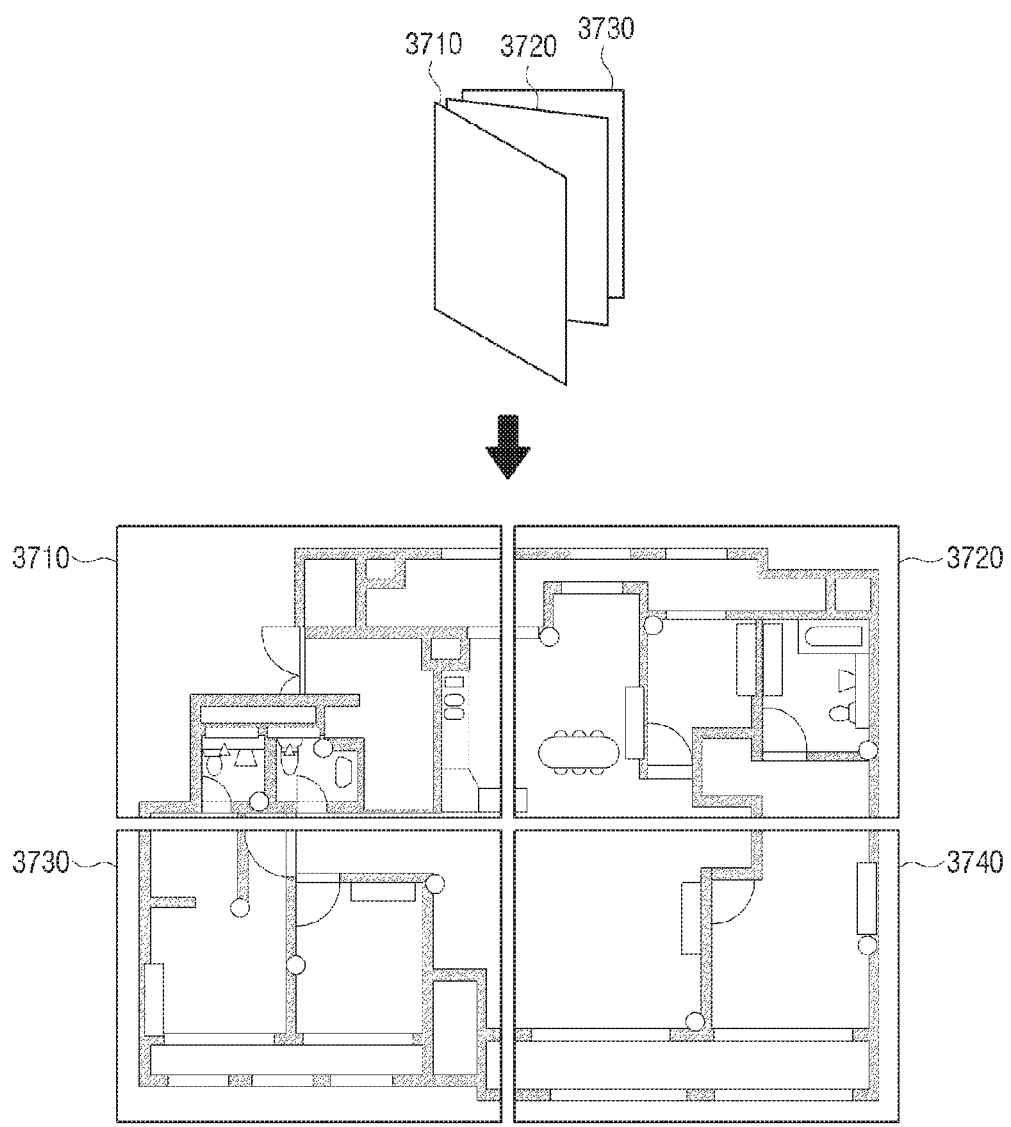

FIG. 38 is a view to illustrate a method for displaying a single content through a plurality of portable display apparatuses.

The plurality of portable display apparatuses may display a single content. In this case, the plurality of portable display apparatuses may detect mutual arrangements using their respective sensors, determine content areas 3710, 3720, 3730, and 3740 of the content to be displayed according to the detected arrangements, and display the determined content areas.

In the illustrated example, the four portable display apparatuses are combined to display a single image. However, in practice, three or less portable display apparatuses may be used or five or more portable display apparatus may be combined. Specifically, an example of a case in which two portable display apparatuses are combined will be explained below with reference to FIG. 39.

Figure 39:
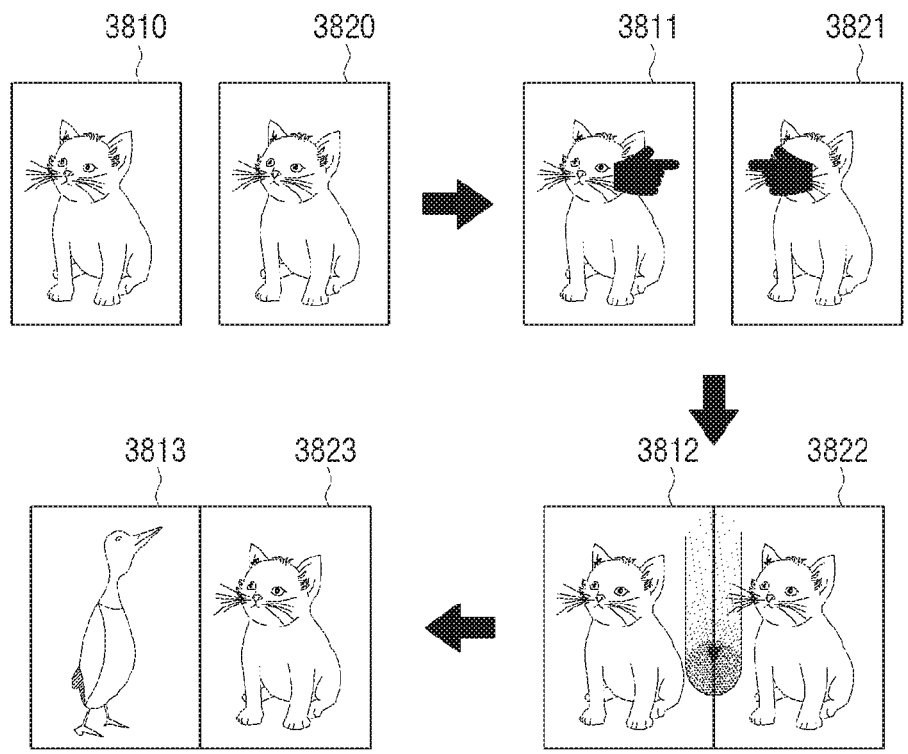

FIG. 39 is a view to illustrate a method for displaying a content in a book mode through two portable display apparatuses.

The user may transmit a single content (3810, 3820) to the two portable display apparatuses.

In this case, the user may arrange the two portable display apparatuses as if they are attached to each other (3811, 3821), and may input a common touch gesture (3812, 3822) to the two portable display apparatuses. In this case, it may be recognized that the two portable display apparatuses are converted into the book mode, the arrangements of the two portable display apparatuses may be detected, and an odd page may be displayed on the left portable display apparatus and an even page may be displayed on the right portable display apparatus according to the arrangements (3813, 3823).

Figure 40:
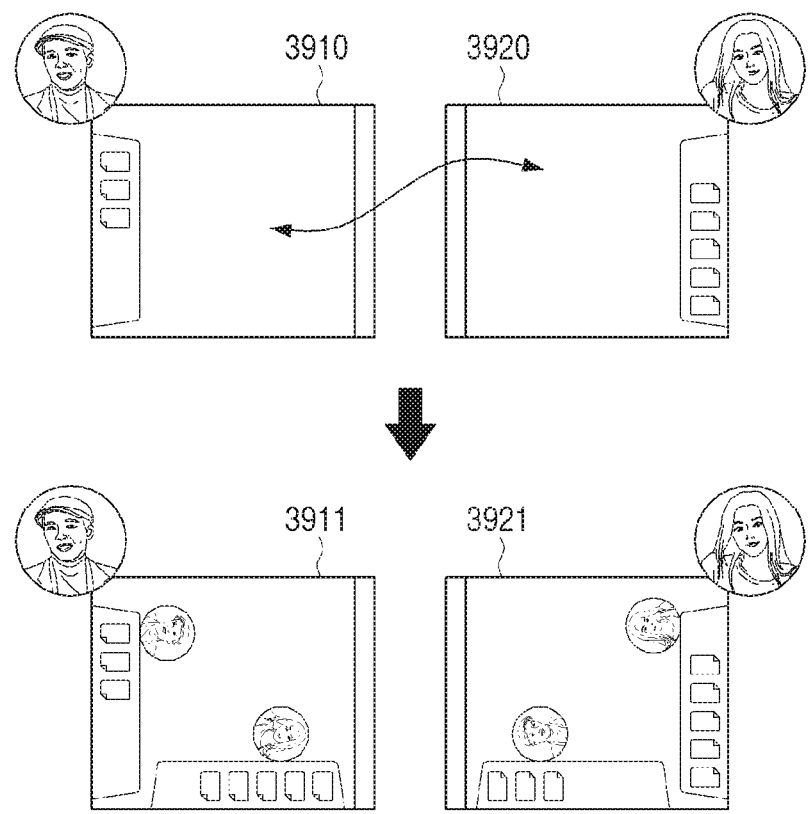

FIG. 40 is a view to illustrate two portable display apparatuses which interwork with each other.

In response to the portable display apparatuses 3910 and 3920 owned by different users being arranged close to each other, it may be determined that cooperation will be performed, and the two portable display apparatuses may interwork with each other and display folders corresponding to their own accounts and folders corresponding to the other's account (3911 and 3921).

Figure 41:
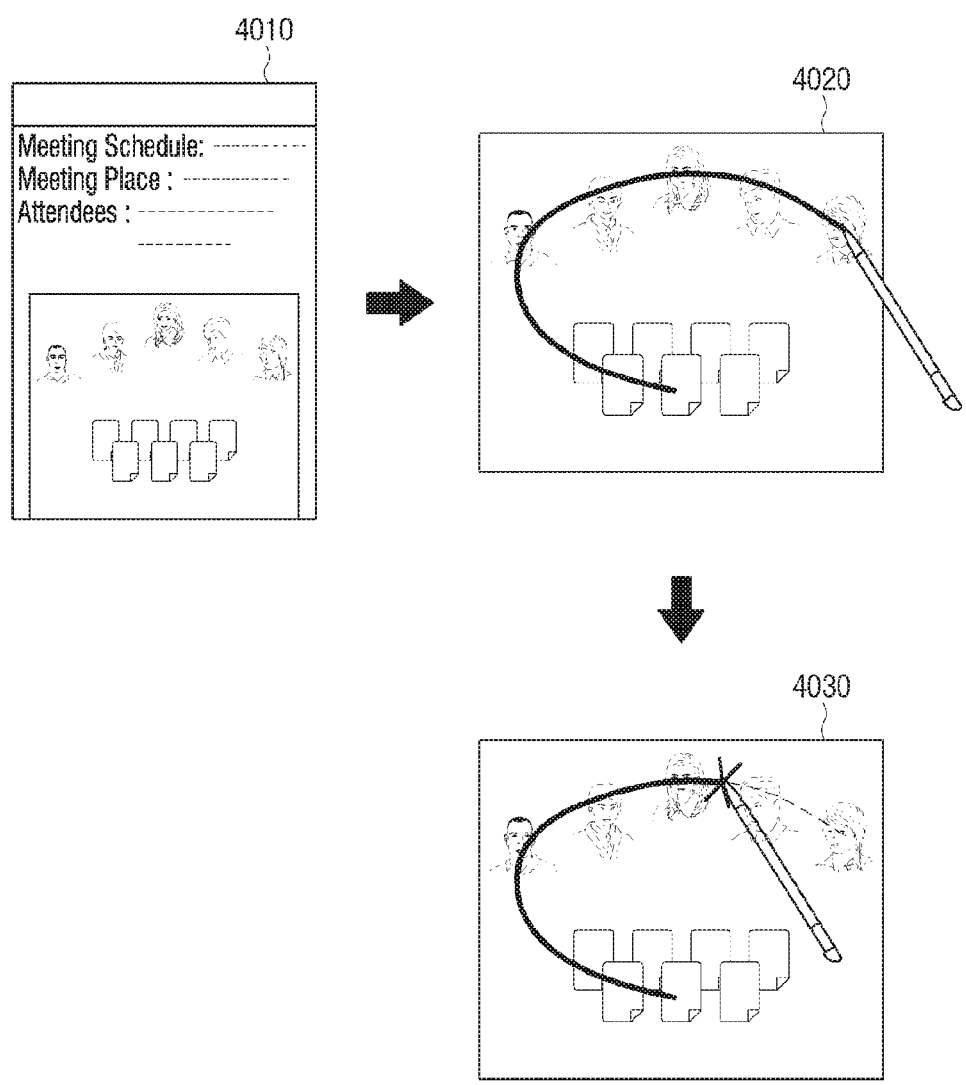

FIG. 41 is a view to illustrate a method for sharing a file in a portable display apparatus.

Referring to FIG. 41, the portable display apparatus 4010 displays a file to be shared and targets to share the file (4010).

In this case, the user may determine the targets to share the file by making a predetermined touch gesture (4020). In response to the user wrongly selecting a target and an X gesture being inputted to the displayed UI, a target to which the corresponding gesture is inputted may be excluded from the pre-selected targets (4030).

Figure 42:
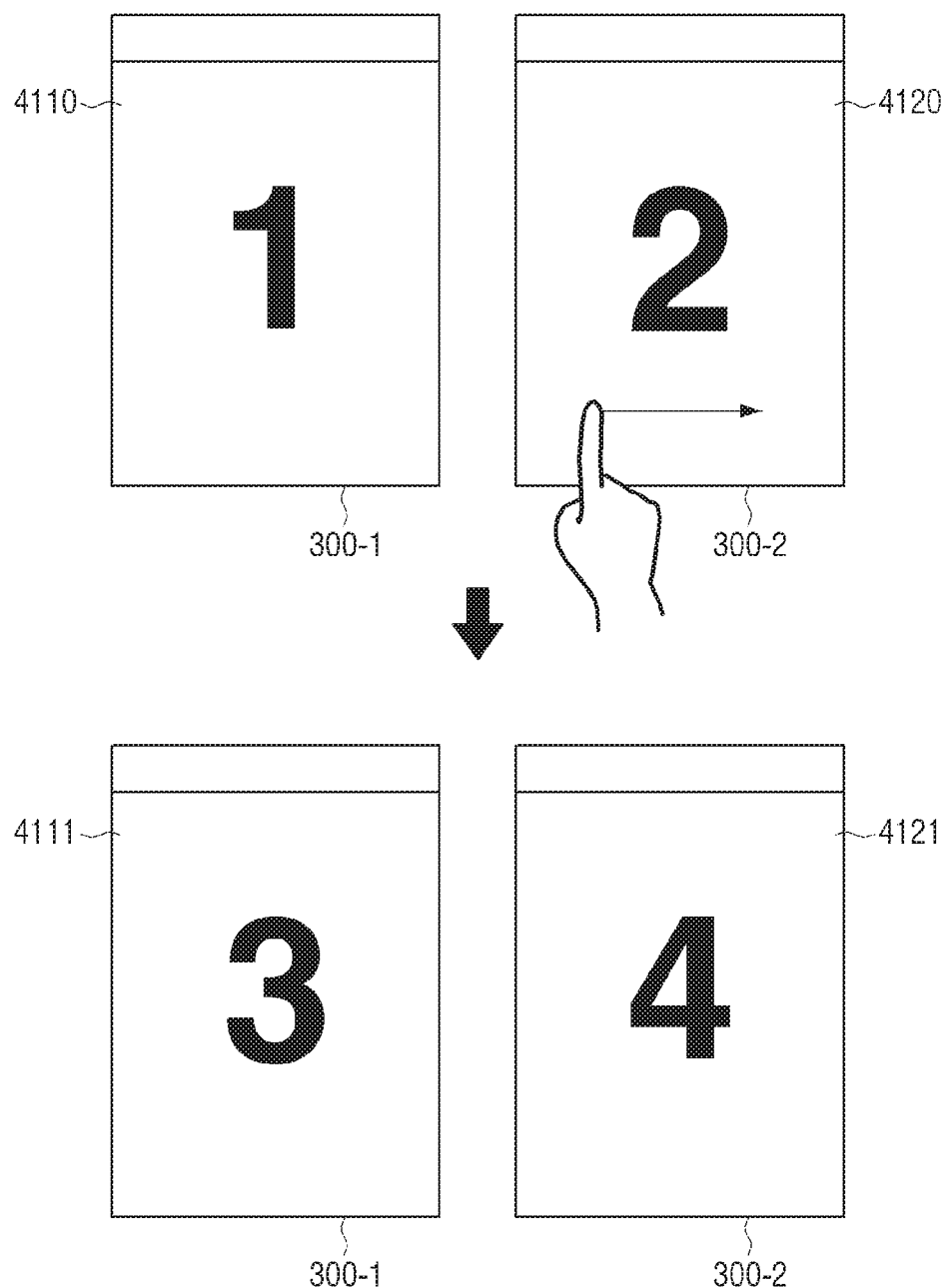
Figure 43:
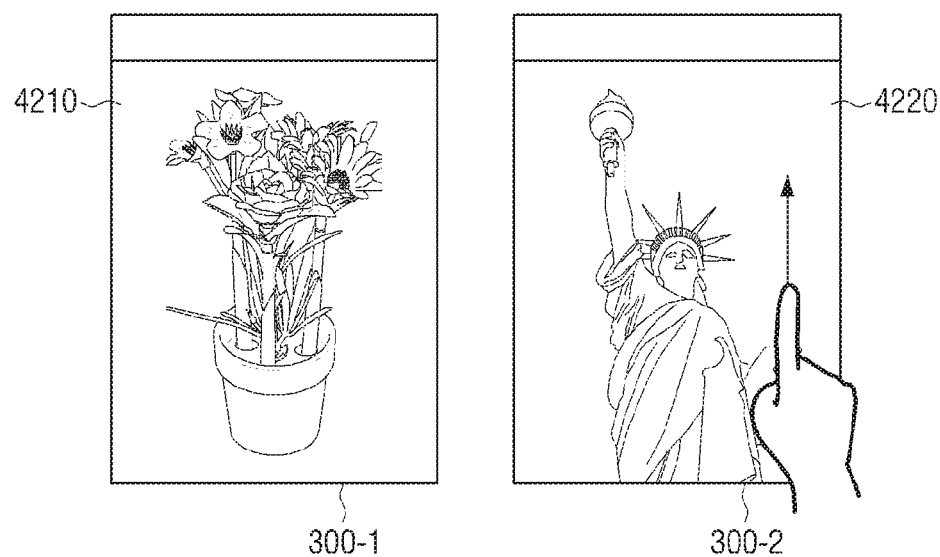
Figure 43:
Figure 43:
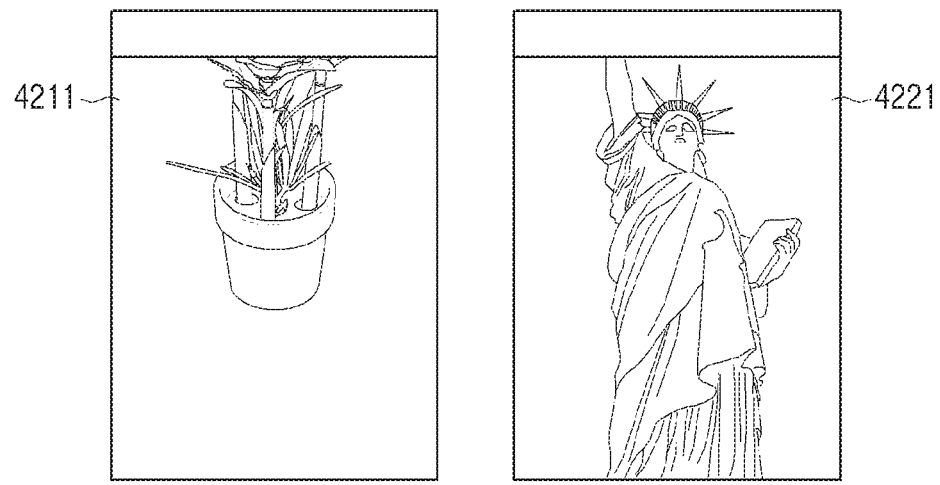

FIGS. 42 and 43 are views to illustrate examples of a plurality of portable display apparatuses which operate by interworking with one another.

Referring to FIG. 42, the same content is stored in the two portable display apparatuses 300-1, 300-2. In addition, in response to the two portable display apparatuses being arranged in parallel by the user, the two portable display apparatuses may recognize mutual arrangements, and the left portable display apparatus may display page 1 (4110) and the right portable display apparatus may display page 2 (4120).

In this case, the user may input a page turning gesture in one portable display apparatus. The portable display apparatus 300-2 which receives the input of the page turning gesture may perform a function corresponding to the inputted gesture, that is, a function of turning over to page 4, and may transmit the inputted gesture command to the other interworking portable display apparatus 300-1.

Accordingly, the two portable display apparatuses display pages 3 and 4 (4111, 4121).

Referring to FIG. 43, the two portable display apparatuses display different contents. For example, the left portable display apparatus may display a Korean document (4210), and the right portable display apparatus may display an English translation corresponding to the Korean document.

In this case, the user may input a scroll gesture to one portable display apparatus (4220). The portable display apparatus 300-2 to which the scroll gesture is inputted may scroll a currently displayed page (4221) in response to the inputted gesture, and transmit the inputted gesture command to the other interworking portable display apparatus 300-1 (4211).

Accordingly, the two portable display apparatuses may scroll displayed documents at the same rate.

Figure 44:
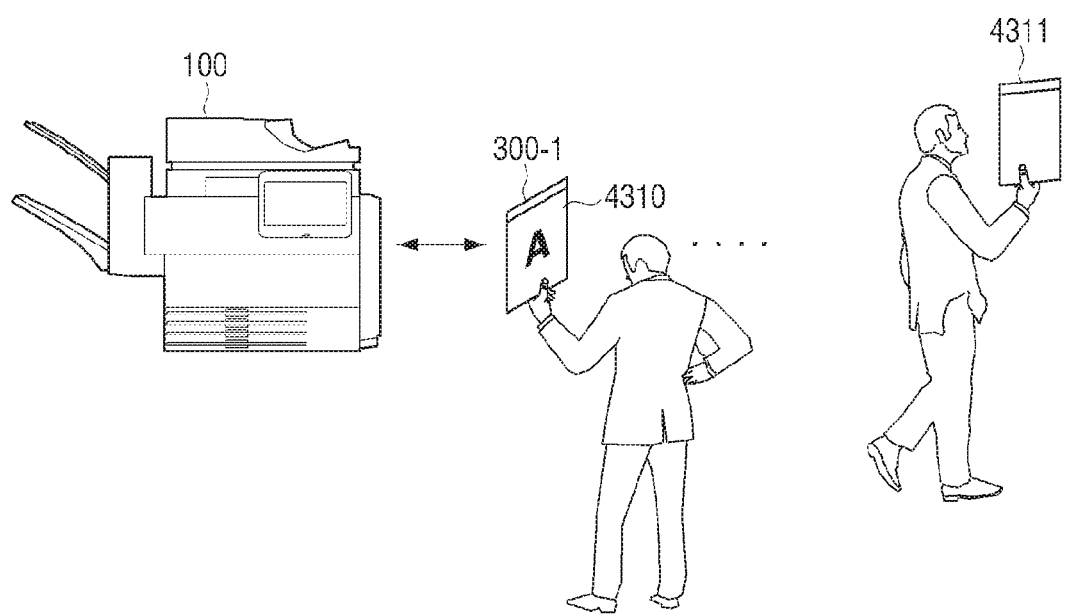
FIG. 44 is a view to illustrate a security function of the portable display apparatus.

FIG. 44 is a view to illustrate a security function of a portable display apparatus. Specifically, FIG. 44 is a view to illustrate an operation of reproducing a content by putting a limit on a space.

Referring to FIG. 44, the portable display apparatus may be connected with the image forming apparatus wirelessly. In this case, the portable display apparatus 300 may periodically check whether it is connected with the image forming apparatus wirelessly.

In addition, in response to the portable display apparatus being placed close to the image forming apparatus 100 and being connected with the image forming apparatus 100 wirelessly, the portable display apparatus may display a content (4310) according to a user request, and, in response to the portable display apparatus being far from the image forming apparatus 100 and being disconnected from the image forming apparatus 100 wirelessly, the portable display apparatus may not display a content requested by the user (4311).

Figure 45:
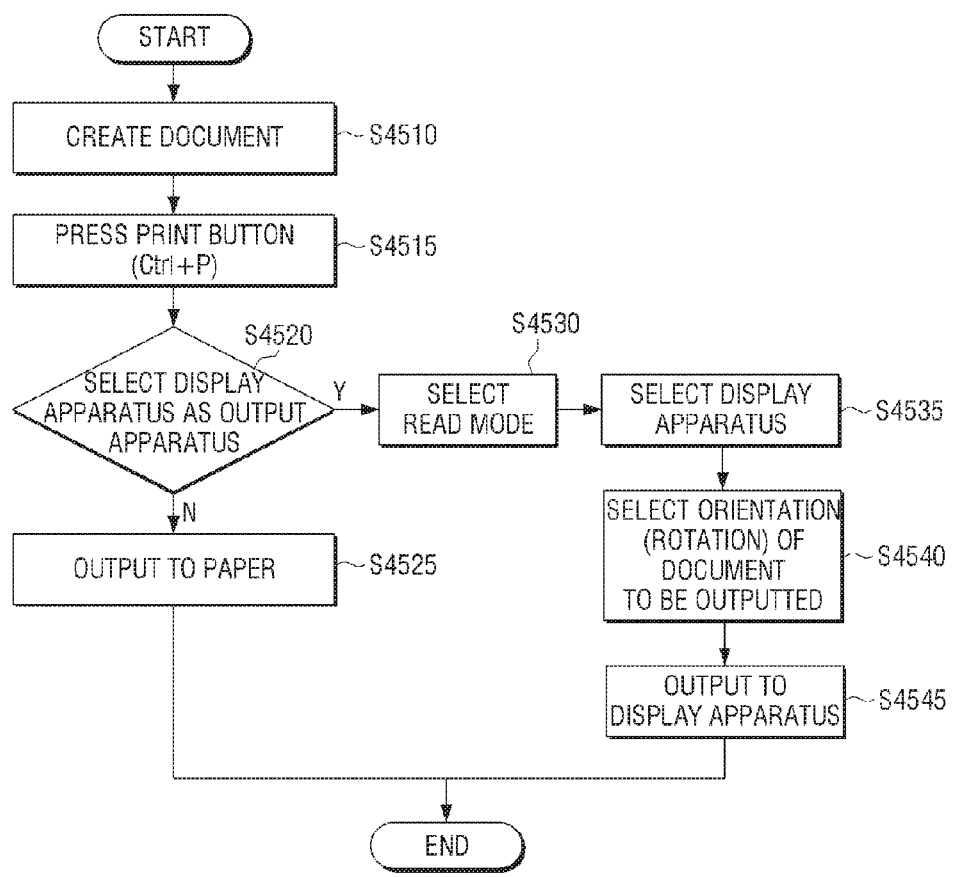
FIG. 45 is a flowchart to illustrate a printing control method of a host device according to an exemplary embodiment.

FIG. 45 is a flowchart to illustrate a printing control method in a host device according to an exemplary embodiment.

Referring to FIG. 45, the user may create a document using an application in the host device (S4510).

The user inputs a print command (or Ctrl+P) regarding the created document (S4515). The user may select a printer driver to perform a printing job regarding the corresponding document, and, in response to the printer driver selected by the user being a normal printer driver (S4520-N), the printing job is performed in the normal printing method (S4525).

In response to the printer driver selected by the user being a virtual printer driver to transmit data to the portable display apparatus (S4520-Y), a user interface window to transmit data to the portable display apparatus may be displayed, and a read mode, an apparatus, and a layout may be additionally selected through the displayed user interface window (S4530, S4535, and S4540), and the document may be transmitted to the portable display apparatus according to the read mode, the device, and the layout selected by the user (S4545).

Accordingly, since the printing control method according to the exemplary embodiment may transmit the document to the portable display apparatus by simply changing the driver in the normal printing method, the user may easily transmit the data to the portable display apparatus. The printing control method of FIG. 45 may be executed on the host device of FIG. 1, or may be executed on host devices having other configurations.

In addition, the printing control method described above may be implemented by using at least one execution program (for example, a printer driver) to execute the above-described printing control method, and such an execution program may be stored in a computer-readable recording medium.

Accordingly, the blocks according to the exemplary embodiments may be implemented as a computer recordable code on a computer readable recording medium. The computer readable recording medium may be a device which may store data readable by a computer system.

Figure 46:
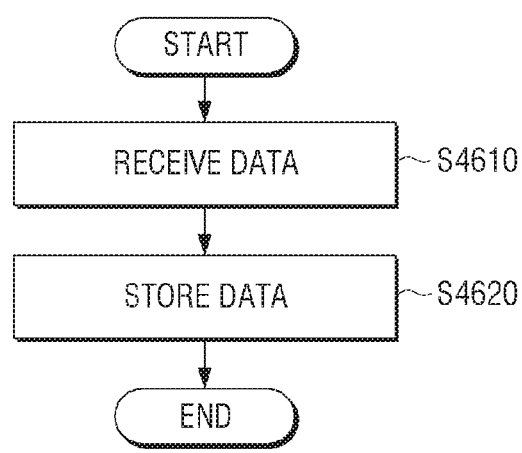
FIG. 46 is a flowchart to illustrate a printing control method of an image forming apparatus according to an exemplary embodiment.

FIG. 46 is a flowchart to illustrate a printing control method of an image forming apparatus according to an exemplary embodiment.

Referring to FIG. 46, the image forming apparatus receives printing data from the host device or the management server (S4610).

In addition, the image forming apparatus stores the received printing data in at least one of the plurality of portable display apparatuses mounted in the docking unit (S4620).

Since the printing control method in the image forming apparatus according to the above-described exemplary embodiment converts the received printing data to be suitable to the portable display apparatus and stores the printing data, the user may easily transmit necessary data to the portable display apparatus. In addition, the printing control method of FIG. 46 may be executed on the image forming apparatus of FIG. 2 or 3, or may be executed on image forming apparatuses having other configurations.

Figure 47:
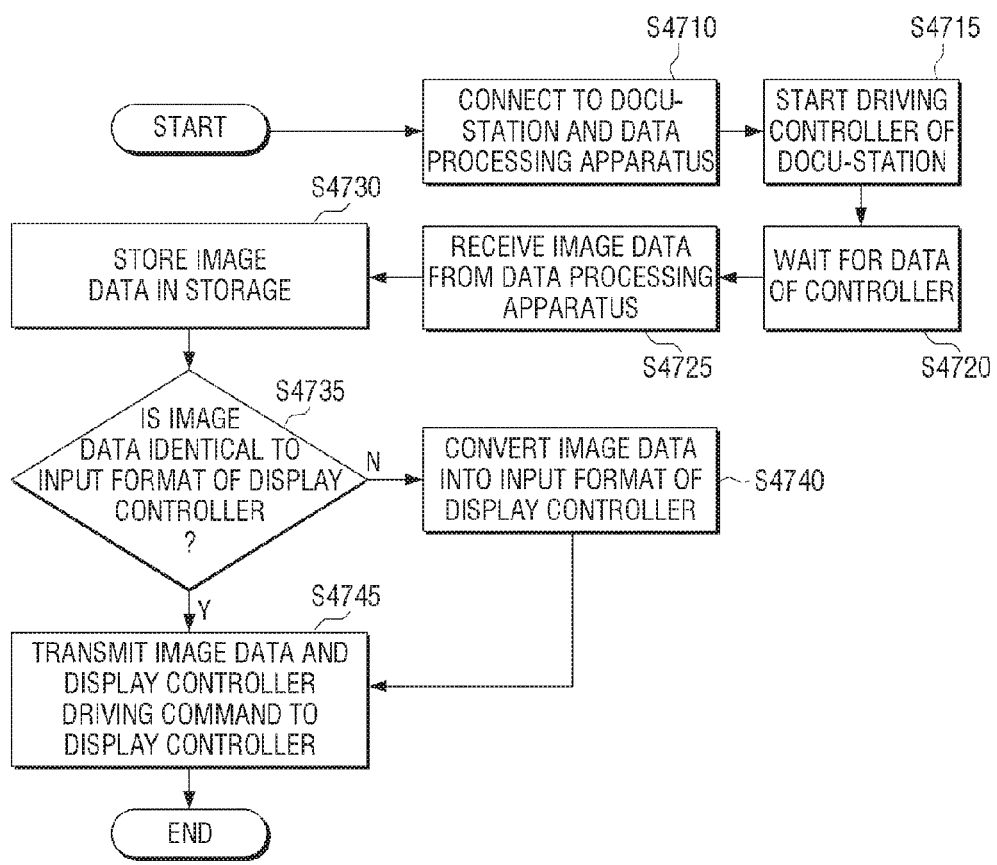
FIG. 47 is a flowchart to illustrate a step of storing data of FIG. 46 in detail.

FIG. 47 is a flowchart to illustrate the operation of storing data of FIG. 46 in detail.

Referring to FIG. 47, the host device is connected with the docking unit first (S4710). In addition, in response to a processor in the docking unit 200 being driven (S4715), the processor detects the portable display apparatus mounted in the docking unit 200 and waits to receive data (S4720).

In addition, the docking unit 200 receives data from the outside (S4725) and temporarily stores the data in a storage (S4730).

In addition, it is determined whether the received data is of a format usable in the portable display apparatus (S4735), and, in response to the received data being determined to have an unusable format, the data may be converted to have a format recognizable in the portable display apparatus (S4740).

In addition, the received data or the converted data may be transmitted to the portable display apparatus, and security information and/or group information regarding the corresponding data may be transmitted to the portable display apparatus (S4745).

Figure 48:
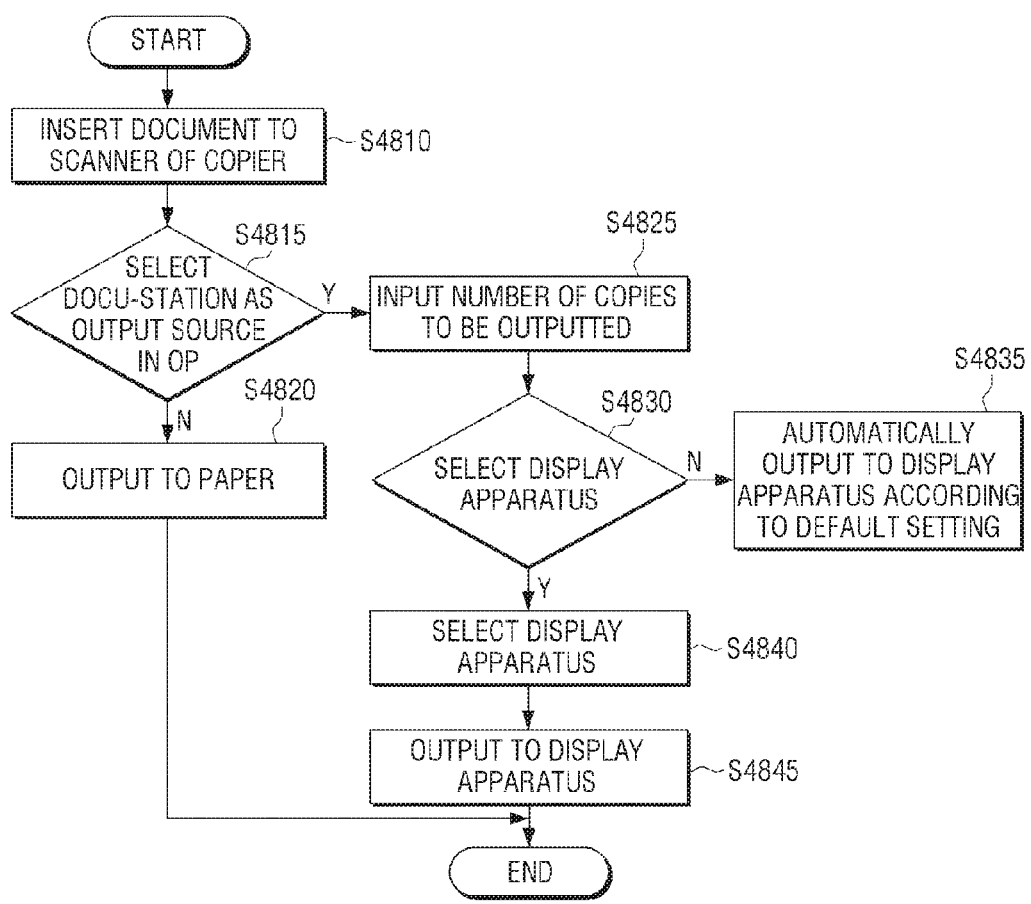
FIG. 48 is a flowchart to illustrate a printing control method according to an exemplary embodiment.

FIG. 48 is a flowchart to illustrate a printing control method according to another exemplary embodiment.

Referring to FIG. 48, first, the user lays a document on a scanner of the image forming apparatus (S4810).

In response to normal copying being selected as a function to be performed (S4815-N), the document may be copied using printing paper (S4820).

On the other hand, in response to EPD copying being selected as a function to be performed (S4815-Y), an input of the number of display apparatuses for copying may be received (S4825).

In addition, an ID of the display apparatus or 'Default' may be selected (S4830). Herein, the 'Default' is to automatically determine the order of the display apparatuses to output the document in the same way as the 'Default' of 'device selection,' (S4835). In response to a display apparatus for copying being selected (S4840), the document may be converted into an image file (PNG, JPG, GIF, BMP) and the image file may be transmitted to the selected display apparatus (S4845).

Figure 49:
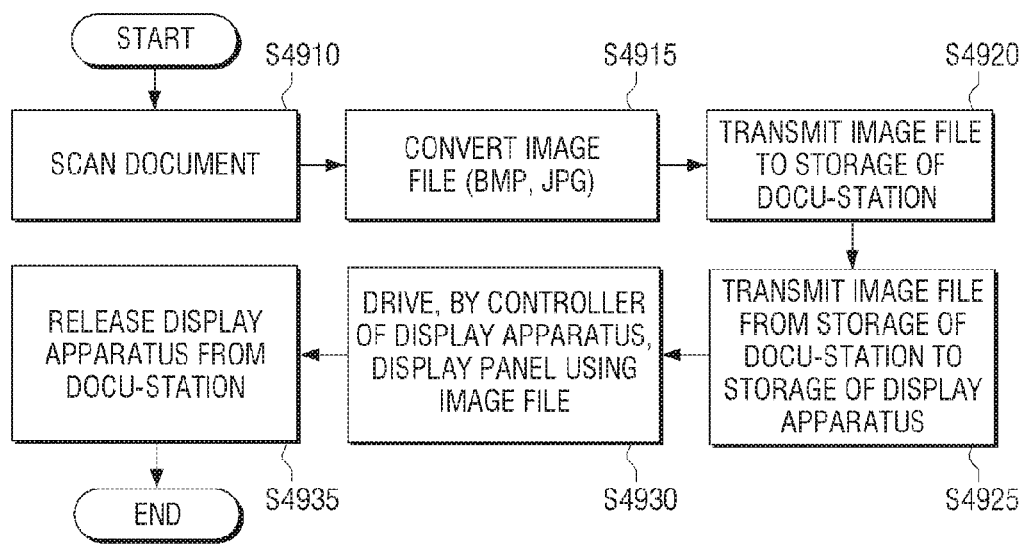
FIG. 49 is a flowchart to illustrate a printing control method according to an exemplary embodiment.

FIG. 49 is a flowchart to illustrate the step of outputting of FIG. 48 in detail.

Referring to FIG. 49, a scan image is generated by scanning a document (S4910). The generated scan image is converted into an image file (S4915). Specifically, in response to the generated scan image being a tiff file or the image format usable in the portable display apparatus being jpg, bmp, etc., the tiff file may be converted into a jpg or bmp file. In practice, the scan image may be generated in the form of a file recognizable in the portable display apparatus in the process of generating the scan image. In this case, the above-described converting process may be omitted.

The converted image file may be transmitted to the docking unit (S4920). The image file temporarily stored in the docking unit may be transmitted to the portable display apparatus (S4925).

The portable display apparatus may drive a display panel and display the transmitted image file (S4930), and may be disconnected from the docking unit (S4935).

In FIG. 49, the portable display apparatus displays the image file on the display panel prior to being disconnected from the docking unit. However, the portable display apparatus may not display the image file prior to being disconnected from the docking unit and may display the image file after being disconnected from the docking unit. In response to the portable display apparatus being disconnected from the docking unit and an operation command (for example, a power on command) for the portable display apparatus being inputted, the image file may be displayed as described above.

Figure 50:
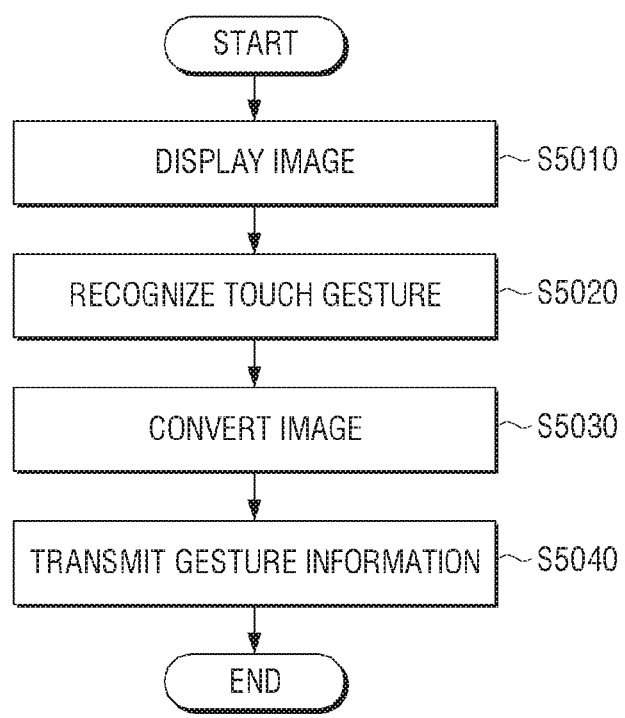
FIG. 50 is a flowchart to illustrate a display method of a portable display apparatus according to an exemplary embodiment.

FIG. 50 is a flowchart to illustrate a display method of the portable display apparatus according to an exemplary embodiment.

Referring to FIG. 50, the portable display apparatus may receive printing data and group information, and display the printing data according to a user command (S5010).

In addition, the portable display apparatus may detect a user touch gesture from the user while displaying the printing data (S5020), and change a displayed content image in response to the detected user touch gesture (S5030).

In addition, the portable display apparatus may transmit touch gesture information to the other portable display apparatuses in the group such that the image is changed in the same way in the other portable display apparatuses (S5040).

Accordingly, since the display method according to the exemplary embodiment receives information on the portable display apparatuses to be operated altogether with the printing data, the plurality of display apparatuses may be easily paired. In addition, since the plurality of paired display apparatuses provide various interactions to the user, user convenience may be enhanced. The display method of FIG. 50 may be executed on the portable display apparatus having the configuration of FIGS. 13 and 14, or may be executed on portable display apparatuses having other configurations.

In addition, the display method described above may be implemented by using at least one execution program to execute the above-described display method, and such an execution program may be stored in a computer-readable recording medium.

Accordingly, the blocks according to the exemplary embodiments may be implemented as a computer recordable code on a computer readable recording medium. The computer readable recording medium may be a device which may store data readable by a computer system.

The foregoing exemplary embodiments and advantages are merely exemplary and are not to be construed as limiting the disclosure. The disclosure may be readily applied to other types of apparatuses. Also, the description of the exemplary embodiments of the disclosure is intended to be illustrative, and not to limit the scope of the claims, and many alternatives, modifications, and variations will be apparent to those skilled in the art.

What is claimed is:

1. An image forming apparatus, comprising:
a main body;
a docking device including a first docking portion configured to physically mount a first portable display apparatus thereon and a second docking portion configured to physically mount a second portable display apparatus thereon, the docking device being configured to be detachably removable from the main body and to be replaceable with a cassette unit which is configured to store printing media, a shape of at least a portion of a body of the docking device corresponding to a shape of at least a portion of the cassette unit, such that when the docking device is removed from the main body, the cassette unit is capable of being inserted into a side of the main body from which the docking device was removed;
a transceiver configured to receive data; and
a processor configured to, when at least one of the first portable display apparatus is mounted on the first docking portion and the second portable display apparatus is mounted on the second docking portion, store the data received by the transceiver in the at least one of the first portable display apparatus and the second portable display apparatus.

2. The image forming apparatus of claim 1, further comprising an image former configured to print data stored in the first portable display apparatus.

3. The image forming apparatus of claim 1, further comprising a scanner configured to scan a document, and
wherein the processor is configured to store data of the document scanned by the scanner in the first portable display apparatus.

4. The image forming apparatus of claim 1, wherein the docking device and the processor are configured to exchange data with each other in a USB interface method.

5. The image forming apparatus of claim 1, wherein
the first docking portion of the docking device comprises a first plurality of pogo pins which are formed on locations corresponding to a first plurality of terminals formed on a side of the first portable display apparatus,
the second docking portion of the docking device comprises a second plurality of pogo pins which are formed on locations corresponding to a second plurality of terminals formed on a side of the second portable display apparatus,
the first plurality of pogo pins are electrically connected with the first plurality of terminals when the first portable display apparatus is mounted on the first docking portion of the docking device, and
the second plurality of pogo pins are electrically connected with the second plurality of terminals when the second portable display apparatus is mounted on the second docking portion of the docking device.

6. The image forming apparatus of claim 1, wherein
the docking device includes a plurality of docking portions configured to physically mount a plurality of portable display apparatuses, the plurality of docking portions including at least the first docking portion and the second docking portion and the plurality of portable display apparatuses including at least the first portable display apparatus and the second portable display apparatus,
the processor is configured to determine an apparatus group to store the data, and
transmit image data corresponding to the data to two or more of the plurality of portable display apparatuses corresponding to the apparatus group determined by the processor.

7. The image forming apparatus of claim 6, further comprising a user manipulator configured to receive a selection of two or more of the plurality of portable display apparatuses to store the data, and
wherein the processor is configured to determine the apparatus group to store the data according to the two or more of the plurality of portable display apparatuses selected via the user manipulator.

8. The image forming apparatus of claim 6, wherein the processor is configured to provide information on portable display apparatuses belonging to the apparatus group to the apparatus group determined by the processor.

9. The image forming apparatus of claim 1, wherein, in response to the at least one of the first portable display apparatus and the second portable display apparatus being mounted on the docking device, the processor is configured to store data stored in the at least one of the first portable display apparatus and the second portable display apparatus in at least one of a storage of the image forming apparatus and a storage of an external server.

10. The image forming apparatus of claim 9, wherein the processor is configured to arrange data stored in a plurality of portable display apparatuses which are mounted on the docking device, and store the data arranged by the processor in at least one of the storage of the image forming apparatus and the storage of the external server.

11. The image forming apparatus of claim 10, wherein the data arranged by the processor is at least one of data which is generated by a portable display apparatus, data which is received from other portable display apparatuses, and data which is updated reflecting a user input.

12. The image forming apparatus of claim 1, wherein the processor is configured to encrypt the data received by the transceiver and store the data encrypted by the processor in the at least one of the first portable display apparatus and the second portable display apparatus.

13. The image forming apparatus of claim 12, wherein the processor is configured to store security information regarding the data encrypted by the processor in the at least one of the first portable display apparatus and the second portable display apparatus along with the data encrypted by the processor,
wherein the security information comprises at least one of information on a number of times the data encrypted by the processor is reproduced, validity date information, and information on a place for reproducing the data encrypted by the processor.

14. The image forming apparatus of claim 1, wherein the data received by the transceiver is at least one of printing data received from a host device, a document file, and an image file.

15. A printing control method of a docking device of an image forming apparatus having a main body, the method comprising:
mounting a portable display apparatus in a first docking portion of the docking device among a plurality of docking portions of the docking device, the plurality of docking portions each being configured to have a respective portable display apparatus mounted thereon, and the docking device being configured to be detachably removable from the main body and to be replaceable with a cassette unit which is configured to store printing media, a shape of at least a portion of a body of the docking device corresponding to a shape of at least a portion of the cassette unit, such that when the docking device is removed from the main body, the cassette unit is capable of being inserted into a side of the main body from which the docking device was removed;

receiving data; and storing the received data in the portable display apparatus mounted in the docking device.

16. An image forming apparatus, comprising:

a main body;

at least one of a scanner, a printer, and a copier to perform an image forming operation;

a processor configured to process data regarding the image forming operation; and a docking device, detachably removable from the main body, including:
  a first slot configured to accommodate a first portable display apparatus to be physically mounted in the first slot,
  a second slot configured to accommodate a second portable display apparatus to be physically mounted in the second slot,
  a first transceiver configured to receive the data regarding the image forming operation via the processor, and
  a second transceiver configured to, when the first portable display apparatus is mounted in the first slot, transmit the data received via the processor regarding the image forming operation to the first portable display apparatus, wherein a shape of at least a portion of a body of the docking device corresponds to a shape of at least a portion of a paper storage cassette configured to store paper, such that when the docking device is removed from the main body, the paper storage cassette is capable of being inserted into a side of the main body from which the docking device was removed.

17. The image forming apparatus of claim 16, wherein the body of the docking device further includes a paper feeding box insertion guide which is slidably insertable into the side of the main body.

18. The image forming apparatus of claim 16, wherein the docking device includes a plurality of slots including the first slot and the second slot, and the second transceiver comprises a plurality of transceivers that correspond in number to a number of the plurality of slots included in the docking device.

* * * * *

UNITED STATES PATENT AND TRADEMARK OFFICE
CERTIFICATE OF CORRECTION

PATENT NO. : 9,936,096 B2  
APPLICATION NO. : 15/244646  
DATED : April 3, 2018  
INVENTOR(S) : Sung-jin Park et al.

Page 1 of 1

It is certified that error appears in the above-identified patent and that said Letters Patent is hereby corrected as shown below:

In the Drawings

In FIG. 29, Sheet 30 of 51, reference numeral 2800, Line 4, delete "Apparatu" and insert -- Apparatus --, therefor.

In FIG. 29, Sheet 30 of 51, reference numeral 2800, Line 6, delete "Apparatu" and insert -- Apparatus --, therefor.

In the Claims

In Column 36, Lines 15-16, in Claim 8, after "apparatus group", delete "to the apparatus group".

Signed and Sealed this  
Twenty-first Day of August, 2018

Andrei Iancu  
*Director of the United States Patent and Trademark Office*